United States Patent
Bowers et al.

(10) Patent No.: US 10,395,181 B2
(45) Date of Patent: Aug. 27, 2019

(54) MACHINE LEARNING SYSTEM FLOW PROCESSING

(71) Applicant: Facebook, Inc., Menlo Park, CA (US)

(72) Inventors: Stuart Michael Bowers, Menlo Park, CA (US); Hussein Mohamed Hassan Mehanna, Cupertino, CA (US); Alisson Gusatti Azzolini, San Francisco, CA (US); Jeffrey Scott Dunn, Seattle, WA (US); Rodrigo Bouchardet Farnham, Atherton, CA (US); James Robert Paton, Fremont, CA (US); Aleksandr Sidorov, Menlo Park, CA (US); Pamela Shen Vagata, Menlo Park, CA (US); Xiaowen Xie, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 380 days.

(21) Appl. No.: 14/732,513

(22) Filed: Jun. 5, 2015

(65) Prior Publication Data

US 2016/0358103 A1    Dec. 8, 2016

(51) Int. Cl.
*G06N 3/12* (2006.01)
*G06N 20/00* (2019.01)
*G06F 9/48* (2006.01)

(52) U.S. Cl.
CPC .......... *G06N 20/00* (2019.01); *G06F 9/4881* (2013.01); *G06N 3/12* (2013.01)

(58) Field of Classification Search
None
See application file for complete search history.

(56) References Cited

U.S. PATENT DOCUMENTS

| | | |
|---|---|---|
| 9,135,559 B1 | 9/2015 | Szeto et al. |
| 2009/0265290 A1 | 10/2009 | Ciaramita et al. |
| 2010/0179855 A1 | 7/2010 | Chen et al. |
| 2012/0054040 A1 | 3/2012 | Bagherjeiran et al. |
| 2013/0191372 A1 | 7/2013 | Lee et al. |

(Continued)

OTHER PUBLICATIONS

Oren, Improving the Effectiveness of Information Retrieval with Genetic Programming, Masters Thesis, University of the Witwatersrand, 2002, pp. 1-67.*

(Continued)

*Primary Examiner* — Wilbert L Starks
(74) *Attorney, Agent, or Firm* — Fenwick & West LLP

(57) ABSTRACT

Some embodiments include a method of machine learner workflow processing. For example, a workflow execution engine can receive an interdependency graph of operator instances for a workflow run. The operator instances can be associated with one or more operator types. The workflow execution engine can assign one or more computing environments from a candidate pool to execute the operator instances based on the interdependency graph. The workflow execution engine can generate a schedule plan of one or more execution requests associated with the operator instances. The workflow execution engine can distribute code packages associated the operator instances to the assigned computing environments. The workflow execution engine can maintain a memoization repository to cache one or more outputs of the operator instances upon completion of the execution requests.

20 Claims, 10 Drawing Sheets

(56) References Cited

U.S. PATENT DOCUMENTS

| | | |
|---|---|---|
| 2014/0108308 A1 | 4/2014 | Stout |
| 2014/0337096 A1 | 11/2014 | Gilad-Bachrach et al. |
| 2015/0106311 A1 | 4/2015 | Birdwell et al. |
| 2015/0379426 A1 | 12/2015 | Dirac et al. |
| 2016/0300156 A1 | 10/2016 | Bowers et al. |
| 2016/0358101 A1 | 12/2016 | Bowers et al. |
| 2016/0358102 A1 | 12/2016 | Bowers et al. |
| 2017/0017886 A1 | 1/2017 | Gao et al. |
| 2017/0076198 A1 | 3/2017 | Bowers et al. |
| 2017/0124486 A1 | 5/2017 | Chan et al. |
| 2017/0124487 A1 | 5/2017 | Szeto et al. |
| 2018/0004835 A1 | 1/2018 | Piechowicz |
| 2018/0004859 A1 | 1/2018 | Piechowicz et al. |
| 2018/0007145 A1 | 1/2018 | Piechowicz |

OTHER PUBLICATIONS

Oren, Improving the Effectiveness of Information Retrieval with Genetic Programming, Masters Thesis, University of the Witwatersrand, 2002, pp. 1-67 (Year: 2002).*

U.S. Appl. No. 14/684,041 by Bowers, S., et al., filed Apr. 10, 2015.

U.S. Appl. No. 14/732,501 by Bowers, S., et al., filed Jun. 5, 2015.

U.S. Appl. No. 14/732,509 by Bowers, S., et al., filed Jun. 5, 2015.

Demšar, Janez, et al. "Orange: data mining toolbox in Python." *The Journal of Machine Learning Research* 14.1 (2013): 2349-2353.

RapidMiner Studio Manual, 2014, [online], [retrieved on Aug. 13, 2015]. Retrieved from: <http://docs.rapidminer.com/downloads/RapidMiner-v6-user-manual.pdf>, 116 pages.

Microsoft Azure, "Machine Learning: Powerful cloud-based predictive analytics." [website], [retrieved on Aug. 13, 2015]. Retrieved from the internet: http://azure.microsoft.com/en-us/services/machine-learning/, 2014, 6 Pages.

U.S. Appl. No. 15/199,335 by Piechowicz, S., et al., filed Jun. 30, 2016.

U.S. Appl. No. 15/199,351 by Piechowicz, S., et al., filed Jun. 30, 2016.

U.S. Appl. No. 15/199,403 by Piechowicz, S., et al., filed Jun. 30, 2016.

U.S. Appl. No. 14/799,517 by Gao, T., et al., filed Jul. 14, 2015.

U.S. Appl. No. 14/851,336 by Jin, O., et al., filed Sep. 11, 2015.

Niu, F. et al., "Hogwild!: A Lock-free Approach to Parallelizing Stochastic Gradient Descent", Computer Sciences Department, University of Wisconsin-Madison, Jun. 2011, pp. 1-22.

Non-Final Office Action dated Nov. 30, 2017 for U.S. Appl. No. 14/799,517 by Gao, T., et al., filed Jul. 14, 2015.

Leroux et al. A Genetic Programming Problem Definition Langauge Code Generator for the EpochX Framework, Proceedings of the Companion Publication of the 2014 Annual Conference on Genetic and Evolutionary Computation, 2014, pp. 1149-1154.

Non-Final Office Action dated Oct. 13, 2017 for U.S. Appl. No. 14/684,041 by Bowers, S., et al., filed Apr. 10, 2015.

Non-Final Office Action dated Oct. 4, 2017 for U.S. Appl. No. 14/732,501 for Bowers, S. filed Jun. 5, 2016.

Oren, N., "Improving the Effectiveness of Information Retrieval with Genetic Programming," Dec. 2002, Research Report, University of Witwatersrand, Johannesburg, South Africa, sixty-seven pages.

* cited by examiner

MACHINE LEARNING SYSTEM FLOW PROCESSING

CROSS-REFERENCE TO RELATED APPLICATIONS

This application is related to U.S. patent application Ser. No. 14/684,041, entitled "MACHINE LEARNING MODEL TRACKING PLATFORM," which was filed on Apr. 10, 2015; U.S. Patent Application, entitled "MACHINE LEARNING SYSTEM INTERFACE," filed on the same day as the present application; and U.S. Patent Application, entitled "MACHINE LEARNING SYSTEM FLOW AUTHORING TOOL," filed on the same day as the present application; all of which are incorporated by reference herein in their entirety.

BACKGROUND

"Big data" is a broad term for datasets so large or complex that traditional data processing applications are often inadequate. For example, a social networking system can run several application services that pertain to big data. The term "big data" also often refers to the use of predictive analytics or other methods to extract values from data. For example, analysis of datasets can find new correlations, trends, patterns, categories, etc. Such analyses rely on machine learning and often consumes a large amount of computational resources (e.g., memory capacity, processor capacity, and/or network bandwidth).

A typical machine learning workflow may include building a model from a sample dataset (referred to as a "training set"), evaluating the model against one or more additional sample datasets (referred to as a "validation set" and/or a "test set") to decide whether to keep the model and to benchmark how good the model is, and using the model in "production" to make predictions or decisions against live input data captured by an application service. The training set, the validation set, and/or the test set can respectively include pairs of input datasets and expected output datasets that correspond to the respective input datasets.

Various web-based or mobile applications often rely on machine learning models to process large and complex "big data" to provide application services (e.g., personalized or targeted application services) to a large number of users. There is frequently a need for higher accuracy and/or consistency models while the requirements of these models are ever evolving. Experiments involving the training and evaluation of these models nevertheless take time and are typically the manual burdens of one or more developers or analysts.

Figure 1:
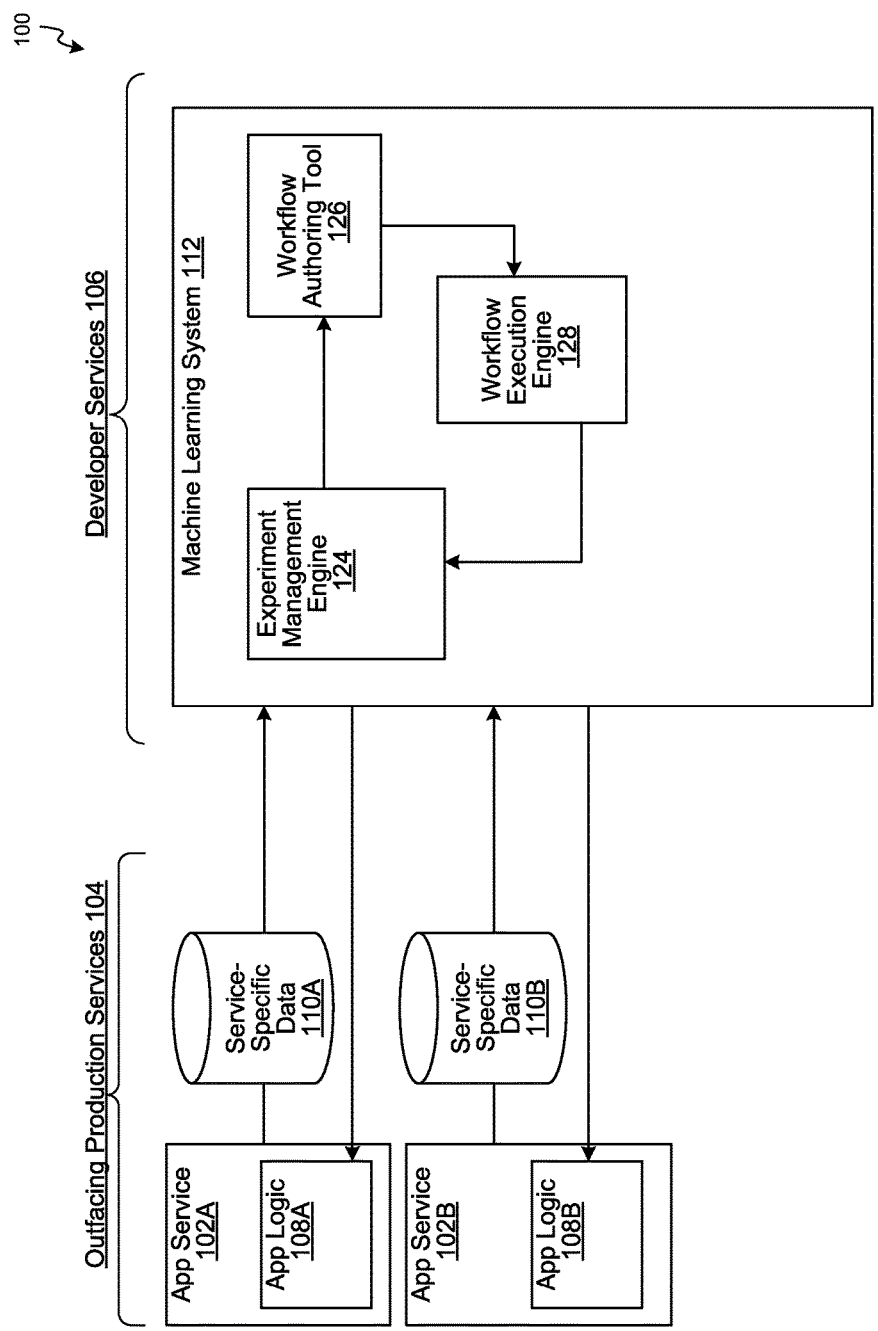
FIG. 1 is a block diagram illustrating an application service system 100, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

A machine learning system can be implemented by one or more computing devices to facilitate design, execution, analysis, evaluation, and/or generation of machine learning related processes (e.g., pre-processing or post-processing machine learning data, training machine learning models, testing or experimenting with machine learning models, etc.). In several embodiments, the machine learning system can implement at least an experiment management engine, a workflow authoring tool, and a workflow execution engine. Several embodiments pertain to the workflow execution engine.

The machine learning system can include an authorship environment (e.g., implemented by the workflow authoring tool) and an execution platform (e.g., implemented by the workflow execution engine) for developers and analysts to build machine learning pipelines with automated dependency handling, front-end process management, and built-in components for various algorithms and output formats. The machine learning system advantageously enables machine learning in a computing system (e.g., an application service system and/or a social networking system) to be more reproducible and enables collaborative authorship and execution of machine learning processes and experiments.

Experiments and workflows can be managed via a user interface (UI) or an application programming interface (API). The UI and/or API can be executed on one or more dedicated computer tiers. For example, the UI enables an operating user to associate an experiment with one or more workflows for processing one or more input data sets into at one or more outputs. An "experiment" corresponds to a run instance of at least one workflow. An experiment can have experiment parameters. For example, the experiment parameters can be a run identifier (e.g., a title/description and/or a run sequence number), an indication of one or more workflows, an indication of one or more input parameters (e.g., input datasets, input data sources and/or input data configurations for the workflows, or any combination thereof. For example, the input data configurations can define which portion of an input dataset to use. In some embodiments, an experiment parameter is a workflow run parameter.

A "workflow" is an execution pipeline in a machine learning system to create, modify, evaluate, validate, and/or utilize one or more machine learning models (e.g., including pre-processing of input data and post-processing of output data from the machine learning models). A workflow, for example, can be composed of a directed graph (DG) of data processing operators and can have an associated output schema. In some embodiments, the DG can be acyclical. In some embodiments, the DG can include iterative feedback loops and/or recursion. During each workflow run/experiment, the workflow execution engine can programmatically generate the DG from a workflow definition (e.g., textual representation or other representative format of the workflow). In some cases, different workflow runs of the same workflow can have entirely different DGs. A workflow can inherit attributes from another workflow. In one example, all workflows can inherit attributes from a basic workflow. Workflows can accept one or more input parameters (e.g., functional arguments). Workflows can expose its data processing operators as members, elements of member lists, or elements of member dictionaries.

A workflow can utilize a pipeline of data processing operators and be configured to process one or more input datasets consistent with an input schema into one or more outputs consistent with an output schema. The input datasets can be passed in as or identified by at least one of the input parameters. In some embodiments, the DG of the data processing operators represent interdependencies of the data processing operators, where each directed edge represents an output of a data processing operator feeding into an input of another data processing operator. In several embodiments, more than one instance of a single data processing operator can be represented in the DG. For example, a data processing operator that normalizes a dataset can be used multiple times in the pipeline. In some embodiments, the input schema and the output schema are defined in the workflow. For example, the input schema is defined by a data processing operator at the front of the pipeline and the output schema is defined by a data processing operator at the end of the pipeline.

A data processing operator type is a computational unit. Instances of the data processing operator type can be scheduled to run on a single host device or a single operating environment (e.g., a virtual device) in an indivisible manner. Data processing operator types are the building blocks for workflows and are reusable across workflows. Different instances of the same data processing operator types can be used in the same workflow. Some operators can be used to run programmable scripts. For example, a "Bash" operator or an "R" operator which can be used to run an arbitrary bash script or R script respectively. Each data processing operator exposes an input schema defining one or more types of data it expects as its one or more inputs. Each data processing operator can also define an output schema defining one or more types of data it produces as its one or more outputs. Inputs to a data processing operator may be outputs from another data processing operator. The workflow execution engine can automatically handle scheduling data processing operators appropriately such that a data processing operator will not run until all of its inputs have been materialized by one or more data processing operators that produce them.

Data processing operators and/or workflows can expose output schemas describing the set of items they produce. In some embodiments, an input or output (I/O) schema can be associated with a serialization format. In some embodiments, each workflow with a defined output schema and corresponding serialization format can automatically upload its outputs according to the serialization format to a memoization database of operator outputs. This enables the machine learning system to automatically produce visualizations of outputs and reuse outputs that another data processing operator or workflow would otherwise have to re-calculate.

In some embodiments, a data processing operator defines an input summary format and an output summary format. In turn, the data processing operator at the front of the pipeline for a workflow can define the input summary format of the workflow. Likewise, the data processing operator at the end of the pipeline can define the output summary format of the workflow. An input summary format can describe the look and feel of a summary of the input datasets of the data processing operator and an output summary format can describe the look and feel of a summary of the outputs of the data processing operator.

When the machine learning system runs an experiment based on a workflow, the machine learning system can generate visualizations of the inputs and outputs of the experiment according to the input summary format and the output summary format. In some embodiments, the visualizations or representations of the visualizations are stored on the machine learning system and can be accessed by the user. In some embodiments, the visualizations are presented to the user automatically (e.g., when the visualizations are generated) as part of an experiment tracking dashboard. In some embodiments, the machine learning system sends the visualizations to one or more associated operating users of an experiment, in response to detecting that the experiment has finished running. The summary formats can describe to the machine learning system how to compute summary data, how to render the summary data, how to present the summary data (e.g., dimensionalities to present, whether to remove outliers, what colors to use, size of the visualization, etc.), in what form to render the data (e.g., a pie chart, a linear graph, a comparison table, etc.), and whether and/or how to sample the data prior to presentation.

One or more resource constraints can be associated with one or more data processing operators in the workflow. For example, the resource constraints can include a memory capacity threshold, a number of CPUs threshold, a number of GPUs threshold, a network bandwidth restriction, a geographic region restriction (e.g., relative or absolute), a network location restriction (e.g., relative or absolute), or any combination thereof.

A user of the platform can utilize the experiment management engine to author an experiment (e.g., an entirely new experiment or a modified experiment based on a previously defined experiment). The authorship of the experiment is defined through the workflow authoring tool, where the user defines the workflow as a set of "operators," each with at least one input dataset and at least one output dataset. The user can define the input of one operator as the output of another operator. When the user finalizes the workflow definition, the workflow execution engine can traverse (e.g., examine individually in sequence) through the input and output linkages of the operators as a directed graph to infer the interdependencies amongst the operators. By parsing the workflow definition (e.g., text formatted according to a workflow definition language), the workflow execution engine can: determine one or more production or ephemeral code packages (e.g., code packages from different programming languages and/or libraries) required for the workflow based on the operator definitions; identify machines (e.g., physical devices or virtual devices) to run the operators according to resource constraints explicitly or implicitly defined in the workflow; determine one or more available parallelisms based on the inferred interdependencies; expunge redundant schedule of operators by checking against a memoization repository, schedule executions of the operators in the identified machines based on the available parallelisms; cache resulting output of the operators in the memoization repository; and render an experiment report based on the result of the scheduled executions and the rendering parameters defined by the workflow and/or at least one of the associated operators.

Referring now to the figures, FIG. 1 is a block diagram illustrating an application service system 100, in accordance with various embodiments. The application service system 100 provides one or more application services (e.g., an application service 102A and an application service 102B, collectively as the "application services 102") to client devices over one or more networks (e.g., a local area network and/or a wide area network). The application service system 100 can provide the application services 102 via an application programming interface (API), a Web server, a mobile service server (e.g., a server that communicates with client applications running on mobile devices), or any combination thereof. In some embodiments, the application service system 100 can be a social networking system (e.g., the social networking system 502 of FIG. 5). The application services 102 can process client requests in real-time. The client requests can be considered "live traffic." For example, the application services 102 can include a search engine, a photo editing tool, a location-based tool, an advertisement platform, a media service, an interactive content service, a messaging service, a social networking service, or any combination thereof.

The application service system 100 can include one or more outfacing production services 104 that are exposed to the client devices, directly or indirectly, and one or more developer services 106 that are not exposed to the client devices. The developer services 106 can be used by operators of the application service system 100 to monitor, maintain, or improve the application services 102. In one example, at least one of the outfacing production services 104 can directly communicate with the client devices and respond to client requests from the client devices. In another example, a first outfacing production service can indirectly provide its service to the client devices by servicing a second outfacing production service. The second outfacing production service, in turn, can either directly provide its service to the client devices or provide its service to a third outfacing production service that directly provides its service to the client devices. That is, the outfacing production services 104 may be chained when providing their services to the client devices.

The application services 102 may be part of the outfacing production services 104. Each of the application services 102 can include an application logic module (e.g., executable code, binary, or script) that may be executed by a computer server (e.g., the computing device 600 of FIG. 6) hosting an application service. For example, the application service 102A can include an application logic module 108A and the application service 102B can include an application logic module 108B (e.g., collectively as the "application logic modules 108"). An application logic module provides the decision-making logic when responding to service requests (e.g., client requests or service requests from other application services). The service requests to the application logic modules and the corresponding responses generated by the application logic modules can be tracked and/or stored in a service-specific database. The service-specific database can also store metadata and/or analysis associated with each application service. For example, the application service 102A can maintain a service-specific data repository 110A and the application service 102B can maintain a service-specific data repository 110B. The service-specific data repositories 110A and 110B can be collectively referred to as "the service-specific data repositories 110."

In various situations, the decision-making logic can be improved over time via data analysis of user data in the service-specific data repositories 110. Several embodiments provides a machine learning system 112 that implements a platform to facilitate improvement of these decision-making logics via running machine learning experiments. These experiments can be based on real-time or aggregated user data in the service-specific data repositories 110. In several embodiments, the developer services 106 include the machine learning system 112. The machine learning system 112 provides a platform that facilitates big data experiments on the application service system 100. For example, the machine learning system 112 can include an experiment management engine 124, a workflow authoring tool 126, and a workflow execution engine 128.

The experiment management engine 124 can facilitate creation of new experiments. Each experiment can correspond to at least one workflow. A workflow can be defined by one or more data processing operators working together in a pipeline (e.g., represented by a directed acyclic graph) to process one or more input datasets into one or more outputs. The workflow can also define a summary format to facilitate analysis (e.g., comparative analysis, statistical analysis, evaluative analysis, or any combination thereof) of the outputs or the input datasets. For example, the summary format can describe how to post process the outputs to generate an illustrative presentation (e.g., an image, a table, a graph, or other media objects). In some embodiments, a workflow or a data processing operator in a workflow can define one or more resource constraints for running itself. The resource constraints can be defined by a user during creation of the workflow or the data processing operator or automatically estimated by the workflow authoring tool 126. The resource constraints, for example, can include a memory requirement (e.g., persistent data storage capacity requirement and/or run-time data storage capacity requirement), a processing power requirement, a network bandwidth requirement, or any combination thereof.

In some embodiments, the workflow authoring tool 126 can include or be coupled to an operator authoring tool to define or modify one or more data processing operators in a workflow. The workflow authoring tool 126 can provide a user interface such that an operating user can search and reference one or more known workflows, known data processing operators, and known resource constraints to associate with a workflow being authored.

The workflow authoring tool 126 facilitates compilation of a workflow. Here, "compilation of a workflow" does not necessarily refer to transforming a source code written in a programming language into a machine executable language. Rather, "compilation of the workflow" refers to the analysis of an arrangement of data processing operators to synthesize information that can be used by the workflow execution engine 128 to schedule distributed tasks to a pool of computing devices.

When an operating user finishes authoring a workflow, the workflow authoring tool 126 can compile the workflow into a workflow execution format manageable by the workflow execution engine 128. The workflow execution format can indicate analysis performed on the workflow by the workflow authoring tool 126. For example, as part of the compilation, the workflow authoring tool 126 can identify interdependencies amongst one or more data processing operators, flag potential inconsistencies in inputs or outputs of the data processing operators, identify one or more code packages associated with the data processing operators and interdependencies of the code packages, identify resource constraints for computing devices that will run the data processing operators, or any combination thereof.

The workflow execution engine 128 can facilitate execution of a workflow associated with an experiment. The workflow execution engine 128 can manage and schedule execution of code packages in accordance with the workflow execution format. For example, the workflow execution engine 128 can select computing devices to run data processing operators of the workflow, distribute code packages corresponding to the data processing operators, distribute references or links to input datasets of the workflow, and/or schedule execution of the code packages on the computing devices. The workflow execution engine 128 can also ensure load-balancing and resource consumption minimization when scheduling the workflow for execution on the selected computing devices (e.g., by managing the selection of the computing devices, distributing appropriate code packages, and/or streaming the input datasets or links thereto ahead of execution schedule while minimizing network bandwidth). The workflow execution engine 128 can schedule execution of the workflow by analysis of the workflow indicated in the workflow execution format to avoid bottlenecks, errors, and inconsistencies. The workflow execution engine 128 can also schedule the execution of the workflow based on statuses of currently running experiments, health data and operation states of the outfacing production services 104 (e.g., as a source of determining when input data will be available) and the developer services 106 (e.g., as entities potentially competing for the same computational resources), and/or scheduled execution times of scheduled experiments. For example, the workflow execution engine 128 can ensure that a data processing operator, which requires the output of another data processing operator to execute, is not executed in parallel with that other data processing operator.

In some embodiments, an experiment analytic interface may be generated by the experiment management engine 124. The experiment analytic interface can be part of the experiment management engine 124. The experiment analytic interface can present results of an experiment to operating users (e.g., developers or analysts) of the application service system 100. The results can be presented according to one or more summary formats defined by a workflow of the experiment.

A workflow of an experiment can include preprocessing of an input dataset, training a machine learning model, validating the machine learning model, processing a test dataset through the machine learning model to compute test results, post-processing the test results for analysis, or any combination thereof. In some examples, the workflow can include post-processing the input dataset for analysis. Post-processing for analysis can include computing statistical measures, computing comparative measures (e.g., between the test results and expected results), computing an evaluative measure (e.g., based on an evaluation algorithm), or any combination thereof.

Social Networking System Overview

Several embodiments of the application service system 100 utilize or are part of a social networking system. Social networking systems commonly provide mechanisms enabling users to interact with objects and other users both within and external to the context of the social networking system. A social networking system user may be an individual or any other entity, e.g., a business or other non-person entity. The social networking system may utilize a web-based interface or a mobile interface comprising a series of inter-connected pages displaying and enabling users to interact with social networking system objects and information. For example, a social networking system may display a page for each social networking system user comprising objects and information entered by or related to the social networking system user (e.g., the user's "profile").

Social networking systems may also have pages containing pictures or videos, dedicated to concepts, dedicated to users with similar interests ("groups"), or containing communications or social networking system activity to, from or by other users. Social networking system pages may contain links to other social networking system pages, and may include additional capabilities, e.g., search, real-time communication, content-item uploading, purchasing, advertising, and any other web-based inference engine or ability. It should be noted that a social networking system interface may be accessible from a web browser or a non-web browser application, e.g., a dedicated social networking system application executing on a mobile computing device or other computing device. Accordingly, "page" as used herein may be a web page, an application interface or display, a widget displayed over a web page or application, a box or other graphical interface, an overlay window on another page (whether within or outside the context of a social networking system), or a web page external to the social networking system with a social networking system plug in or integration capabilities.

As discussed above, a social graph can include a set of nodes (representing social networking system objects, also known as social objects) interconnected by edges (representing interactions, activity, or relatedness). A social networking system object may be a social networking system user, nonperson entity, content item, group, social networking system page, location, application, subject, concept or other social networking system object, e.g., a movie, a band, or a book. Content items can include anything that a social networking system user or other object may create, upload, edit, or interact with, e.g., messages, queued messages (e.g., email), text and SMS (short message service) messages, comment messages, messages sent using any other suitable messaging technique, an HTTP link, HTML files, images, videos, audio clips, documents, document edits, calendar entries or events, and other computer-related files. Subjects and concepts, in the context of a social graph, comprise nodes that represent any person, place, thing, or idea.

A social networking system may enable a user to enter and display information related to the user's interests, education and work experience, contact information, demographic information, and other biographical information in the user's profile page. Each school, employer, interest (for example, music, books, movies, television shows, games, political views, philosophy, religion, groups, or fan pages), geographical location, network, or any other information contained in a profile page may be represented by a node in the social graph. A social networking system may enable a user to upload or create pictures, videos, documents, songs, or other content items, and may enable a user to create and schedule events. Content items and events may be represented by nodes in the social graph.

A social networking system may provide various means to interact with nonperson objects within the social networking system. For example, a user may form or join groups, or become a fan of a fan page within the social networking system. In addition, a user may create, download, view, upload, link to, tag, edit, or play a social networking system object. A user may interact with social networking system objects outside of the context of the social networking system. For example, an article on a news web site might have a "like" button that users can click. In each of these instances, the interaction between the user and the object may be represented by an edge in the social graph connecting the node of the user to the node of the object. A user may use location detection functionality (such as a GPS receiver on a mobile device) to "check in" to a particular location, and an edge may connect the user's node with the location's node in the social graph.

A social networking system may provide a variety of communication channels to users. For example, a social networking system may enable a user to email, instant message, or text/SMS message, one or more other users; may enable a user to post a message to the user's wall or profile or another user's wall or profile; may enable a user to post a message to a group or a fan page; or may enable a user to comment on an image, wall post or other content item created or uploaded by the user or another user. In least one embodiment, a user posts a status message to the user's profile indicating a current event, state of mind, thought, feeling, activity, or any other present-time relevant communication. A social networking system may enable users to communicate both within and external to the social networking system. For example, a first user may send a second user a message within the social networking system, an email through the social networking system, an email external to but originating from the social networking system, an instant message within the social networking system, and an instant message external to but originating from the social networking system. Further, a first user may comment on the profile page of a second user, or may comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection is a social network edge. Being friends in a social networking system may allow users access to more information about each other than would otherwise be available to unconnected users. For example, being friends may allow a user to view another user's profile, to see another user's friends, or to view pictures of another user. Likewise, becoming friends within a social networking system may allow a user greater access to communicate with another user, e.g., by email (internal and external to the social networking system), instant message, text message, phone, or any other communicative interface. Being friends may allow a user access to view, comment on, download, endorse or otherwise interact with another user's uploaded content items. Establishing connections, accessing user information, communicating, and interacting within the context of the social networking system may be represented by an edge between the nodes representing two social networking system users.

In addition to explicitly establishing a connection in the social networking system, users with common characteristics may be considered connected (such as a soft or implicit connection) for the purposes of determining social context for use in determining the topic of communications. In at least one embodiment, users who belong to a common network are considered connected. For example, users who attend a common school, work for a common company, or belong to a common social networking system group may be considered connected. In at least one embodiment, users with common biographical characteristics are considered connected. For example, the geographic region users were born in or live in, the age of users, the gender of users and the relationship status of users may be used to determine whether users are connected. In at least one embodiment, users with common interests are considered connected. For example, users' movie preferences, music preferences, political views, religious views, or any other interest may be used to determine whether users are connected. In at least one embodiment, users who have taken a common action within the social networking system are considered connected. For example, users who endorse or recommend a common object, who comment on a common content item, or who RSVP to a common event may be considered connected. A social networking system may utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

Figure 2:
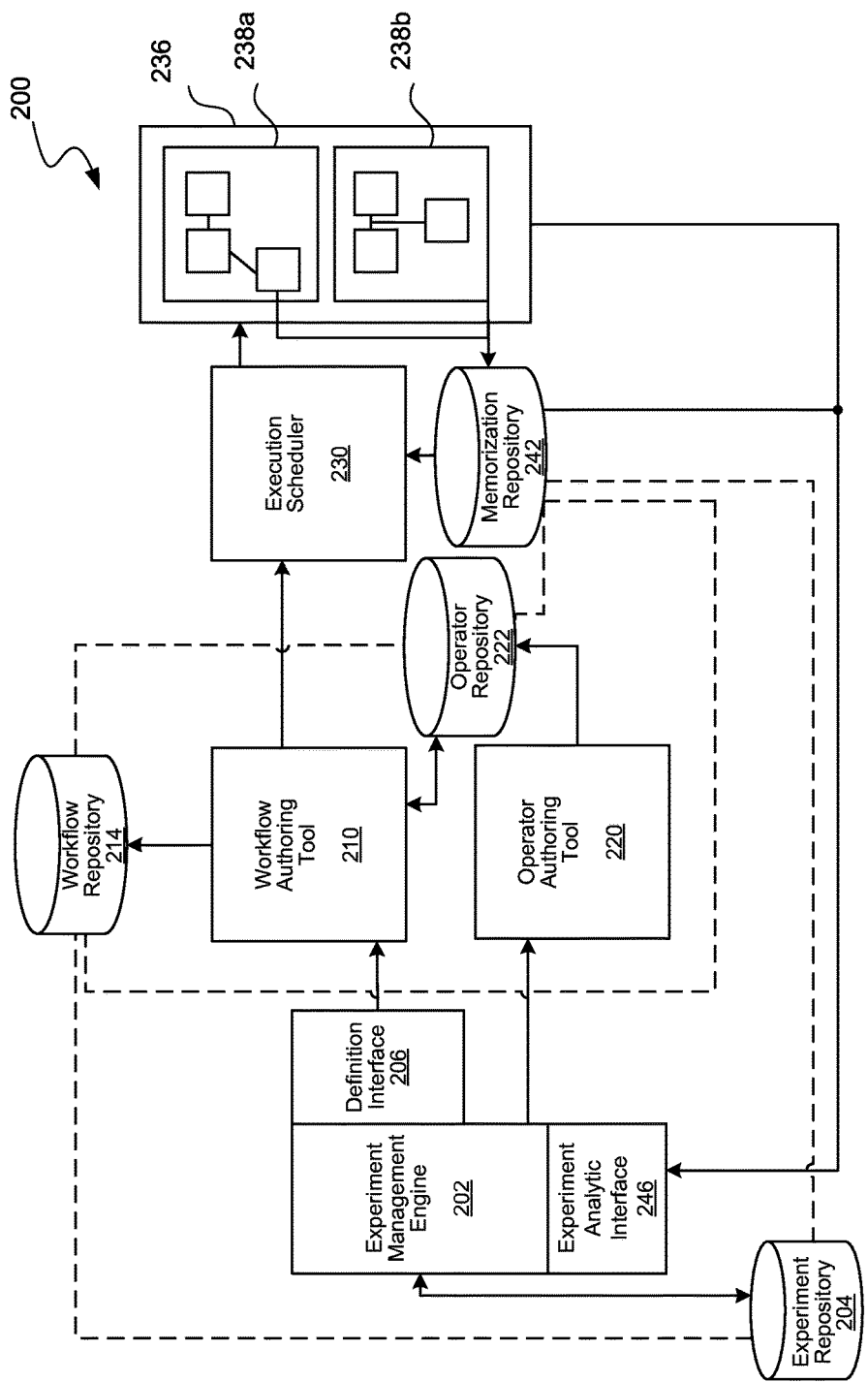
FIG. 2 is a block diagram illustrating a machine learning system that manages big data experiments, in accordance with various embodiments.

FIG. 2 is a block diagram illustrating a machine learning system 200 (e.g., the machine learning system 112 of FIG. 1) that manages big data experiments, in accordance with various embodiments. The machine learning system 200 can facilitate running of machine learning related processes in an application service system (e.g., the application service system 100 of FIG. 1). The application service system can run multiple application services and produce multiple streams of input data based on the service requests and service responses of the application services.

The machine learning system 200 includes an experiment management engine 202 (e.g., the experiment management engine 124 of FIG. 1). The experiment management engine 202 can manage an experiment repository 204 storing data of one or more previously executed or currently running experiments. The data for an experiment can include references to one or more workflows used in the experiment (e.g., including references to workflow related data in a workflow repository 214), one or more input datasets used in the experiment, one or more output results of the experiment (e.g., including references to output results in an memoization repository 242), rendered illustrations (e.g., video or still image representations) of the output results (e.g., including rendered illustrations in the memoization repository 242), or any combination thereof.

The experiment management engine 202 can generate a definition interface 206 to define an experiment. In some embodiments, the experiment management engine 202 can present the definition interface 206 as an internal website accessible to developers and analysts of the application service system. The definition interface 206 can query an operating user to define an experiment by indicating a title of the experiment, a description of the experiment, one or more application services associated with the experiment, a workflow for the experiment, or any combination thereof. The definition interface 206 can also create an experiment by querying the operating user to select a previous experiment from the experiment repository 204 to clone. Once a previous experiment is cloned into a new experiment, the definition interface 206 can receive modifications to the experiment parameters cloned from the selected previous experiment. In some embodiments, the definition interface 206 can create an experiment by querying the operating user to select an existing workflow from the workflow repository 214. Once an existing workflow is cloned into the new experiment, the definition interface 206 can receive modifications to the workflow attributes cloned from the selected existing workflow. The operating user can also fill in other experiment parameters other than the definition of a workflow.

In some embodiments, the definition interface 206 includes a search widget capable of identifying one or more workflows based on a user query of an input schema, an output schema, an input summary format, an output summary format, a title keyword, a description keyword, a tag keyword, a data processing operator keyword, or any combination thereof. The definition interface 206 can present one or more workflows for reviewing, editing, or cloning, that match or are associated with the user query. In some embodiments, the same or a different search widget is capable of identifying one or more data processing operators based on a user query of an input dataset, an input data source, an input schema, an output schema, an input summary format, an output summary format, or any combination thereof, that match one or more respective parameters of the identified data processing operators. The identified workflow and/or data processing operators can be selected to define and/or modify an experiment or a workflow.

A workflow can be defined through a workflow authoring tool 210 (e.g., the workflow authoring tool 126 of FIG. 1). For example, the workflow authoring tool 210 can generate an integrated development environment for scripting a workflow definition in text. In some embodiments, the workflow authoring tool 210 can import a workflow definition from a text file or based on one or more user selections. The workflow authoring tool 210 can compile the imported workflow definition into a workflow execution format (e.g., including interdependency graph of operators and associated code packages and resource constraints). In some embodiments, the workflow authoring tool 210 can import one or more experiment parameters and/or one or more workflow attributes from a text file or based on one or more user selections. The workflow authoring tool 210 can facilitate creation of a workflow from scratch or by cloning an existing workflow in the workflow repository 214 and making modifications to it.

To create a workflow, an operating user can indicate relationships between one or more data processing operators via the user interface of the workflow authoring tool 210. In some embodiments, the operating user can identify the data processing operators and indicate their relationships in a text file and import that to the workflow authoring tool 210. That is, the workflow authoring tool 210 can be used to add or remove data processing operators from a workflow and specify relationships between the data processing operators in the workflow. A relationship can be a directed relationship where one or more outputs of a first data processing operator is passed to a second data processing operator as one or more of its inputs. In some embodiments, more than one instance of a data processing operator can be defined within the workflow.

In several embodiments, the machine learning system 200 includes also an operator authoring tool 220. In some embodiments, the operator authoring tool 220 is part of the workflow authoring tool 210. In other embodiments, the operator authoring tool 220 is coupled to the workflow authoring tool 210 whenever an operating user indicates an intention to edit or create a data processing operator. The operator authoring tool 220 can also include a user interface (e.g., an IDE or a text editor) to facilitate definition of a data processing operator. For example, operator parameters that can be defined in the operator authoring tool 220 include an input schema, an output schema, an input summary format, an output summary format, a resource constraint (e.g., run-time memory requirement or network bandwidth requirement), data processing logics, code package requirements (e.g., these parameters can be device/operating system dependent), programming language indicator, code compiling parameters (e.g., these parameters can be dependent on the programming language used), or any combination thereof. A data processing operator can be an ephemeral operator that is defined specific for a particular workflow or a particular experiment. The operator authoring tool 220 can also set a data processing operator as a "production operator" for inclusion into other workflows or experiments with or without modifications. In some embodiments, all of the data processing operators are stored and tracked in the operator repository 222. In some embodiments, only the production operators are stored and tracked in the operator repository 222.

In several embodiments, an experiment in the experiment repository 204 can reference one or more workflows in the workflow repository 214 or vice versa (e.g., a workflow can make a reference to an experiment). In several embodiments, an experiment in the experiment repository 204 can reference one or more outputs or illustrations in the memoization repository 242, or vice versa (e.g., an output or illustration can make a reference to an experiment). In several embodiments, a workflow in the workflow repository 214 can reference one or more data processing operators in the operator repository 222, or vice versa (e.g., an operator can make a reference to a workflow).

After a workflow is defined, the workflow authoring tool 210 can compile the workflow definition into a workflow execution format (e.g., as previously described). The machine learning system 200 can include an execution scheduler engine (e.g., part of the workflow execution engine 128 of FIG. 1). The execution scheduler engine 230 can schedule to execute an experiment associated with one or more workflows. For each workflow, the execution scheduler engine 230 can select one or more computing environments in a backend computation pool 236 to execute the workflow. In some embodiments, the backend computation pool 236 can include multiple server farms (e.g., a server farm 238A, a server farm 238B, etc., collectively as the "server farms 238"). Each of the server farms 238 can be housed in a different data center and include one or more computing devices. The computing environments can be computing devices (e.g., instances of the computing device 600 of FIG. 6) or virtualized operating systems. The execution scheduler engine 230 can determine, based on the workflow execution format, which of the data processing operators are executed by which of the computing environments in the backend computation pool 236 and the order and constraints of executing the data processing operators.

The execution scheduler engine 230 can also determine how data is to be shared amongst the data processing operators.

One or more data outputs produced from a computing environment executing at least one data processing operator can be stored in a memoization repository 242. Prior to committing resources to execute a data processing operator, the execution scheduler engine 230 can check with the memoization repository 242 to determine whether the process has already been run. The matching performed by the execution scheduler engine 230 can be exact, or with built-in flexibilities. For example, when exact matching is required, the execution scheduler engine 230 can determine whether or not an output stored in the memoization repository 242 is associated with the same input and the same version of the data processing operator. When flexible matching is allowed, the execution scheduler engine 230 can determine a match when the same or similar input is passed into the same version or a different version of the data processing operator to produce the memoized output. The memoized output can be output data or a rendered visualization/illustration. In some embodiments, the memoized outputs in the memoization repository 242 can make references to the associated workflow in the workflow repository 214 and/or the associated data processing operator in the operator repository 222, or vice versa (e.g., an operator and/or a workflow can make a reference to a memoized output).

In some embodiments, the experiment management engine 202 can generate and present an experiment analytic interface 246 to operating users to track one or more experiments. The experiment analytic interface 246 can present results of an experiment to the operating users. The results can be presented according to one or more summary formats defined by a workflow of the experiment. The results can be extracted by the memoization repository 242.

In some embodiments, upon completing a workflow of an experiment, the experiment analytic interface 246 can present interactive elements to trigger re-run of the experiment (e.g., without modification), creation of another experiment (e.g., a brand new experiment or a new experiment based on the original experiment with one or more modifications to its workflow attributes), or any combination thereof. In some embodiments, the experiment analytic interface 246 can present an interactive element to trigger deployment of the workflow as part of or a replacement for an application logic module. In some embodiments, the experiment analytic interface 246 can present an interactive element to trigger deployment of one or more data processing operators in the workflow to replace or to become part of an application logic module, or any combination thereof.

Functional components (e.g., engines, modules, and databases) associated with the application service system 100 and/or the machine learning system 200 can be implemented as circuitry, firmware, software, or other functional instructions. For example, the functional components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). The systems, engines, or devices described may include additional, fewer, or different functional components for various applications.

Type System in Work Authoring Tool

A machine learning system (e.g., the machine learning system 200 of FIG. 2) can implement a type system in a work authoring tool (e.g., the workflow authoring tool 126 of FIG. 2). Developers of the machine learning system can define and execute machine learning processes represented by one or more workflows. A workflow can be represented as a directed graph of data processing operators. The type system enables the developers to describe input schemas and output schemas of the data processing operators as platform-level types that are reproducible and comparable. A data processing operator can reference a predefined type as an I/O schema (e.g., an input schema or as an output schema). In several embodiments, the I/O schemas are programming language independent.

The type system enables the work authoring tool to parse textual representation of a workflow (e.g., a machine learning workflow). For example, the type system enables the work authoring tool to identify potential data sources or known data sets that can be used as one or more inputs to a data processing operator in a workflow. For another example, the type system enables the work authoring tool to identify comparable results from different workflows having the same I/O schema. For example, by matching output schemas of some data processing operators to input schemas of subsequent data processing operators, a workflow execution engine can accurately generate an interdependency graph of the data processing operators in the workflow to facilitate scheduling of the workflow in a distributed computing network. For example, the workflow execution engine can interrogate the underlying textual syntax of a textual representation of a workflow to determine one or more edges in the interdependency graph. Each edge can represent a promised object (e.g., according to an I/O schema) from one data processing operator to another.

The type system can resolve several technical problems faced in a machine learning system concerning big data. Because a developer user can arbitrarily create input types and output types, the type system increases the applicability of the machine learning system to process large volume datasets having complex data structures. Further, by matching output schemas of some data processing operators into input schemas of other data processing operators, the work authoring tool can automatically detect errors in a workflow. For example, the work authoring tool can raise a warning flag in its user interface when an output schema of a workflow does not match an input schema that the output schema feeds into, according to the operator interdependency graph of the workflow.

The type system can also advantageously create dataset types that describe how it can be summarized and/or presented. For example, an input schema or an output schema can have a corresponding input summary generation schema or a corresponding output summary generation schema. A I/O summary generation schema can indicate how to sample, aggregate, and analyze a data set matching the corresponding I/O schema to produce a summary. This summary can include a set of one or more numbers and/or data strings, a table, or an illustration. For example, the I/O summary can include a bar graph, a line graph, a histogram, a pie chart, a learning curve, other graph or illustration type, or any combination thereof. The I/O summary can include feature statistics including statistical values (e.g., mean, standard deviation, range, variance, median, mode, or any combination thereof) of features (e.g., individual measurable properties of a phenomenon being observed in machine learning) used. The I/O summary can include feature importance and/or coverage (e.g., percent of rows in a data set that contains a particular type of feature). For example, the I/O summary can include a representative example of a data set that matches an I/O schema.

In some embodiments, an I/O schema can represent a logical unit instead of a passive data unit. For example, a data processing operator can specify an output schema describing a type corresponding to data processing operators. In one specific example, a data processing operator can be a machine learning model optimizer that optimizes effectiveness of other operators or workflows pertaining to a machine learning application. The model optimizer can take in test data and/or evaluative metrics (e.g., how well the existing operators or workflows perform) as inputs. The model optimizer can produce a data processing operator or a modified workflow as its output. This capability advantageously enables machine learning model training, testing, and optimization in the machine learning system. This introduces reproducibility and comparability (e.g., capability to be indexed, searched, or compared) of model optimizers (e.g., a data processing operator that optimizes other workflows and/or operators).

In several embodiments, the type system can include implicit type conversion operators. An implicit type conversion operator can translate a first I/O schema to a second I/O schema. For example, the workflow authoring tool can detect mismatching I/O schemas (e.g., an output schema of a precedent operator feeding into an input schema of a subsequent operator) on an edge of an interdependency graph of a workflow. The workflow authoring tool can determine whether there is an implicit type conversion operator that can convert the output schema to the input schema in question. If an implicit type conversion operator is identified, the workflow authoring tool can insert the implicit type conversion operator into the interdependency graph between the precedent operator and the subsequent operator without raising a warning flag. If an implicit type conversion operator cannot be identified, the workflow authoring tool can raise a warning flag in its user interface.

In some embodiments, the implicit type conversion operator can bring in additional data during the conversion process that neither matches the first I/O schema nor the second I/O schema. In some embodiments, the implicit type conversion operator can trigger a request to download data from an external source, a request to cache data that is being converted, an execution request for one or more other data processing operators (e.g., data normalization or sampling) on the data being converted, or any combination thereof.

In several embodiments, the type system enables self-documentation of data processing operator types and/or I/O schema types. Various attributes of the data processing operator types and the I/O schema types can be indexed in an operator repository. This enables an operating user to search for operator types and/or I/O schema types matching one or more operator type attributes and schema type attributes. For example, an operating user can search for all operator types that take in a particular I/O schema as an input. In response, the workflow authoring tool can present the matching operator types in its user interface. In another example, an operating user can request the workflow authoring tool to present all I/O schemas involved in executing a workflow. The indexed storage of the operator types and I/O schema types in the operator repository facilitates reproducibility, comparability, and reusability of already defined operators and I/O schemas. For example, the indexing can enable an experiment management engine to generate automatic comparisons between inputs and outputs of similar or identical data processing operator types or between similar or identical I/O schemas.

Figure 3:
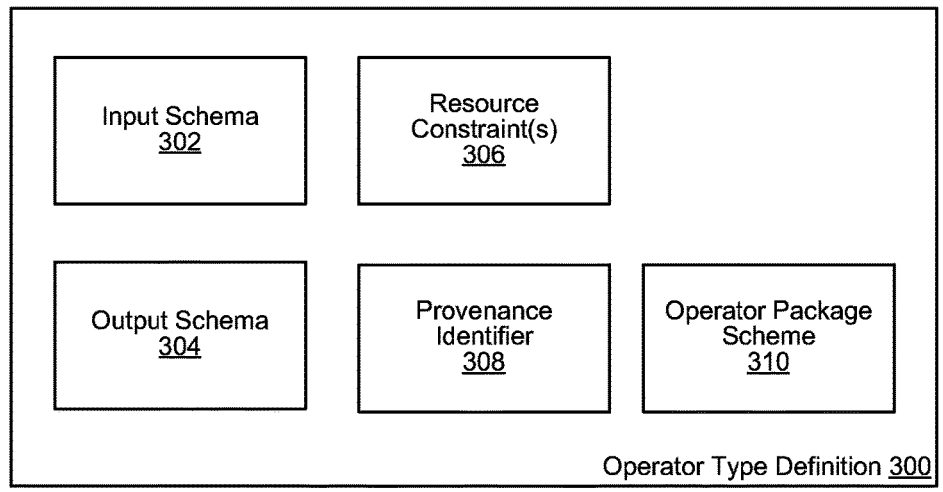
FIG. 3 is a block diagram illustrating an operator type definition, in accordance with various embodiments.

FIG. 3 is a block diagram illustrating an operator type definition 300, in accordance with various embodiments. The operator type definition 300 stores one or more operator attributes representing a data processing operator. Multiple instances of the operator type definition 300 can be included in a workflow (e.g., the workflow represented by the workflow definition of FIG. 7B). In some embodiments, the operator type definition 300 can be constructed based on a text string received through the user interface or an API of a workflow authoring tool (e.g., the workflow authoring tool 126 of FIG. 1). The workflow authoring tool can build the operator type definition 300 from a textual representation of the operator.

The operator type definition 300 can include an input schema 302, an output schema 304, a resource constraint 306, a version provenance identifier 308, an operator package scheme 310, or any combination thereof. The input schema 302 defines what data can potentially be fed into the data processing operator for processing or to configure the data processing operator. The input schema 302 can correspond to one or more I/O schema types (e.g., the I/O schema type definition 400 in FIG. 4) that feed data into the data processing operator. The output schema 304 defines what data is produced from running the data processing operator. The output schema 304 can correspond to one or more I/O schema types.

The resource constraint 306 can define what kind of operating environment and/or computing device can execute the data processing operator. In some embodiments, the resource constraint 306 is defined as part of the operator type definition 300. In some embodiments, the resource constraint 306 is defined when a data processing operator is instantiated as a part of a workflow definition or a workflow run/experiment definition. For example, the resource constraint 306 can include a memory capacity threshold, a number of CPUs threshold, a number of GPUs threshold, a network bandwidth restriction, a geographic region restriction (e.g., relative or absolute), a network location restriction (e.g., relative or absolute), or any combination thereof.

The version provenance identifier 308 identifies the operator type defined by the operator type definition 300 relative to other operator types. For example, the version provenance identifier 308 can indicate that the data processing operator of its type is part of a family of data processing operator types previously defined in the machine learning system (e.g., the machine learning system 200 of FIG. 2).

The operator package scheme 310 defines how an operator instance of the operator type defined by the operator type definition 300 can be distributed to a computing environment/device for execution. For example, the operator package scheme 310 can define how to serialize and/or deserialize executable code or logics associated with the operator type. In another example, the operator package scheme 310 can define whether any executable libraries (e.g., of one or more programming language or for one or more operating environments) are to be distributed together with a serialized package of the operator logics.

Figure 4:
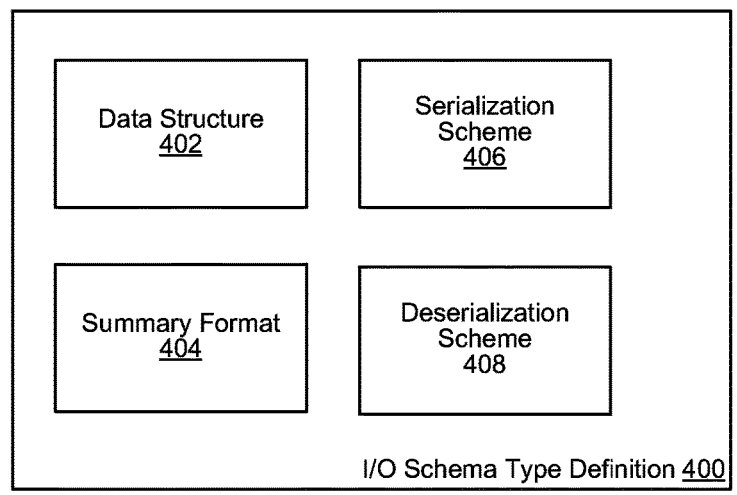
FIG. 4 is a block diagram illustrating an input/output (I/O) schema definition, in accordance with various embodiments.

FIG. 4 is a block diagram illustrating an I/O schema type definition 400, in accordance with various embodiments. The I/O schema type definition 400 defines an I/O schema type. One or more I/O schema types can be referenced in a data processing operator type. The I/O schema type definition 400 stores one or more I/O schema attributes. For example, the I/O schema type definition 400 can include a data structure 402, a summary format 404, a serialization scheme 406, a deserialization scheme 408, or any combination thereof. The data structure 402 can define one or more data objects that are accessible in a dataset matching the I/O schema type. The data structure 402 can also define how the data objects can be stored during run-time in operating memory.

The summary format 404 can describe how to generate a summary of a data set matching the I/O schema type. For example, the summary format 404 can describe how to compute summary data from the data structure 402, how to render the summary data (e.g., via an illustration or a visualization), how to present the summary data, in what form to render the summary data (e.g., a pie chart, a linear graph, a comparison table, etc.), whether and/or how to sample the dataset prior to presenting the rendered summary, or any combination thereof. The summary format 404 can pertain to a textual summary, a graphical summary, a multimedia summary, or any combination thereof.

The serialization scheme 406 can include logics of how to convert the data structure 402 (e.g., with one or more independent data elements) matching the I/O schema type into a serialized string. The serialized string can be used for data transference or for storage in a database. The deserialization scheme 408 can include logics of how to convert the serialized string back to the data structure 402.

Figure 7A:
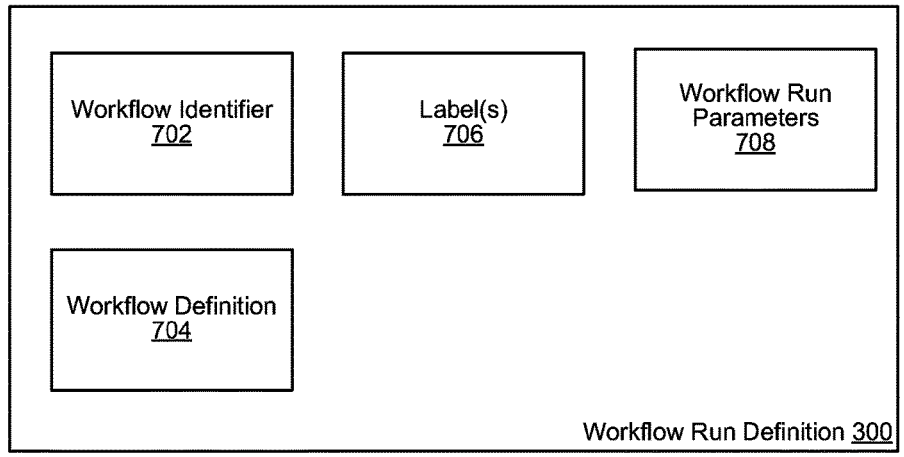
FIG. 7A is a block diagram illustrating a workflow run definition, in accordance with various embodiments.

FIG. 7A is a block diagram illustrating a workflow run definition 700, in accordance with various embodiments. The workflow run definition 700 defines a workflow run. The workflow run can be associated with an experiment being run on the machine learning system. In some embodiments, the workflow run definition 700 can be constructed as a user interface receives one or more inputs from an operating user. In some embodiments, the workflow run definition 700 can be constructed based on a text string imported through the user interface or an API of a workflow authoring tool (e.g., the workflow authoring tool 126 of FIG. 1).

The workflow run definition 700 can include a workflow identifier 702 referencing a workflow definition 704, one or more labels 706, and one or more workflow run parameters 708. The workflow identifier 702 can indicate to an experiment management engine (e.g., the experiment management engine 124 of FIG. 1) which workflow to execute as part of the experiment. The workflow identifier 702 can reference one or more workflow definitions (e.g., the workflow definition 704). The workflow definition 704 can be copied or stored as part of the workflow run definition 700, or be stored in a workflow repository (e.g., the workflow repository 214 of FIG. 2) and referenced by the workflow run definition.

The workflow identifier 702 can be a user selection of a workflow from amongst workflows stored in a workflow repository (e.g., the workflow repository 214 of FIG. 2). In some embodiments, a user interface for defining a workflow run (e.g., the definition interface 206 of FIG. 2) can present a list of workflows for an operating user to select. In some embodiments, the user interface can provide a typeahead query box that generates a dynamic list of workflows satisfying a user's query. The workflow authoring tool can match the user's query against labels of available workflows and place workflows that match the user's query in the dynamic list.

The labels 706 can facilitate operating users to search, clone, modify, edit, and/or review the workflow definition 704. For example, the labels 706 can include a workflow run name, one or more searchable tags, operating-user-defined notes, or any combination thereof. The workflow run parameters 708 are parameters to configure the workflow run. For example, the workflow run parameters 708 can include input parameters to front-line data processing operators.

Figure 7B:
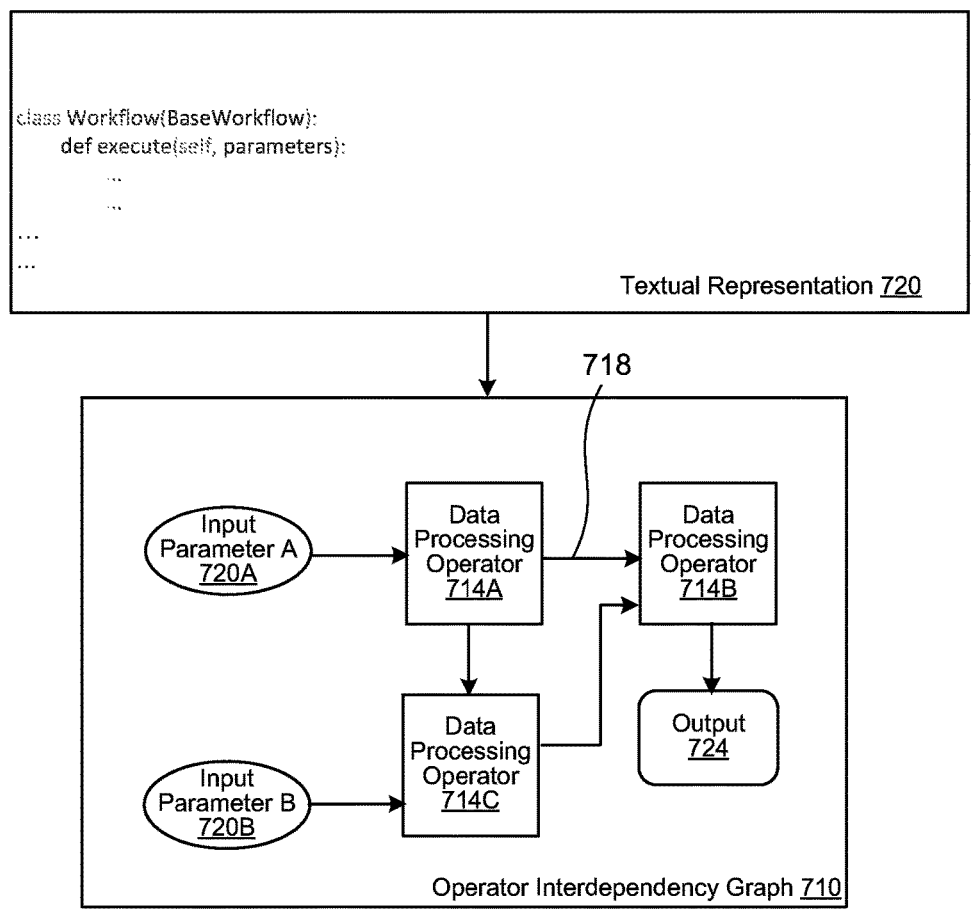
FIG. 7B is a block diagram representative of a workflow definition, in accordance with various embodiments

For example, FIG. 7B is a block diagram representative of a workflow definition (e.g., the workflow definition 704 of FIG. 7A), in accordance with various embodiments. A workflow execution engine (e.g., the workflow execution engine 128 of FIG. 1) can execute the workflow run. For example, the workflow execution engine can locate the workflow definition 704 based on the workflow identifier 702. The workflow definition 704 can correspond to a textual representation 720. The workflow execution engine can parse and traverses the textual representation 720 to produce an operator interdependency graph 710. The operator interdependency graph 710 describes the interdependencies of one or more data processing operators (e.g., a data processing operator 714A, a data processing operator 714B, a data processing operator 714C, etc., collectively as the "data processing operators 714"). The operator interdependency graph 710 can be a directed graph. For example, a directed edge 718 can represent that the data processing operator 714B depends from the data processing operator 714A. That is, an input to the data processing operator 714B is a promise of an output from the data processing operator 714A.

In the example in FIG. 7A, the data processing operator 714B also depends on an output of the data processing operator 714C, which in turn depends on an output of the data processing operator 714A (e.g., the same or different output that feeds into the data processing operator 714B). In the example, the workflow takes in the workflow run parameters 708 (e.g., an input parameter 720A, an input parameter 720B, etc.). The input parameters can include input datasets, identifier/network address of input datasets, input configuration, other static or dynamically defined values, or any combination thereof. In the example, the data processing operator 714A can be considered an independent operator because it does not depend on the output of any other data processing operators. In the example, the data processing operator 714B produces an output 724, which is also the output for the workflow.

In some embodiments, the workflow execution engine can generate the operator interdependency graph 710 in real-time when a workflow run as initiated. In some embodiments, the workflow authoring tool can precompile the operator interdependency graph 710 prior to initiating a workflow run. In some embodiments, when the operator interdependency graph 710 is generated, the workflow authoring tool and/or the workflow execution engine can identify one or more front-line data processing operators responsible for taking in the workflow run parameters 708 (e.g., the data processing operator 714A and the data processing operator 714C). The workflow execution engine or the workflow authoring tool can also identify independent data processing operators (e.g., the data processing operator 714A) that do depend from other operators in the operator interdependency graph 710. In some embodiments, the textual representation 720 can explicitly indicate which are the front-line data processing operators that take in the workflow run parameters 708. In some embodiments, when the operator interdependency graph 710 is generated, the workflow authoring tool and/or the workflow execution engine can identify tail-end data processing operators (e.g., the data processing operator 714B) responsible for producing outputs of the workflow run. For example, the tail-end data processing operators can be one or more operators that no other operators depend from. In some embodiments, the textual representation 720 can explicitly indicate what are the outputs of the workflow.

Figure 8:
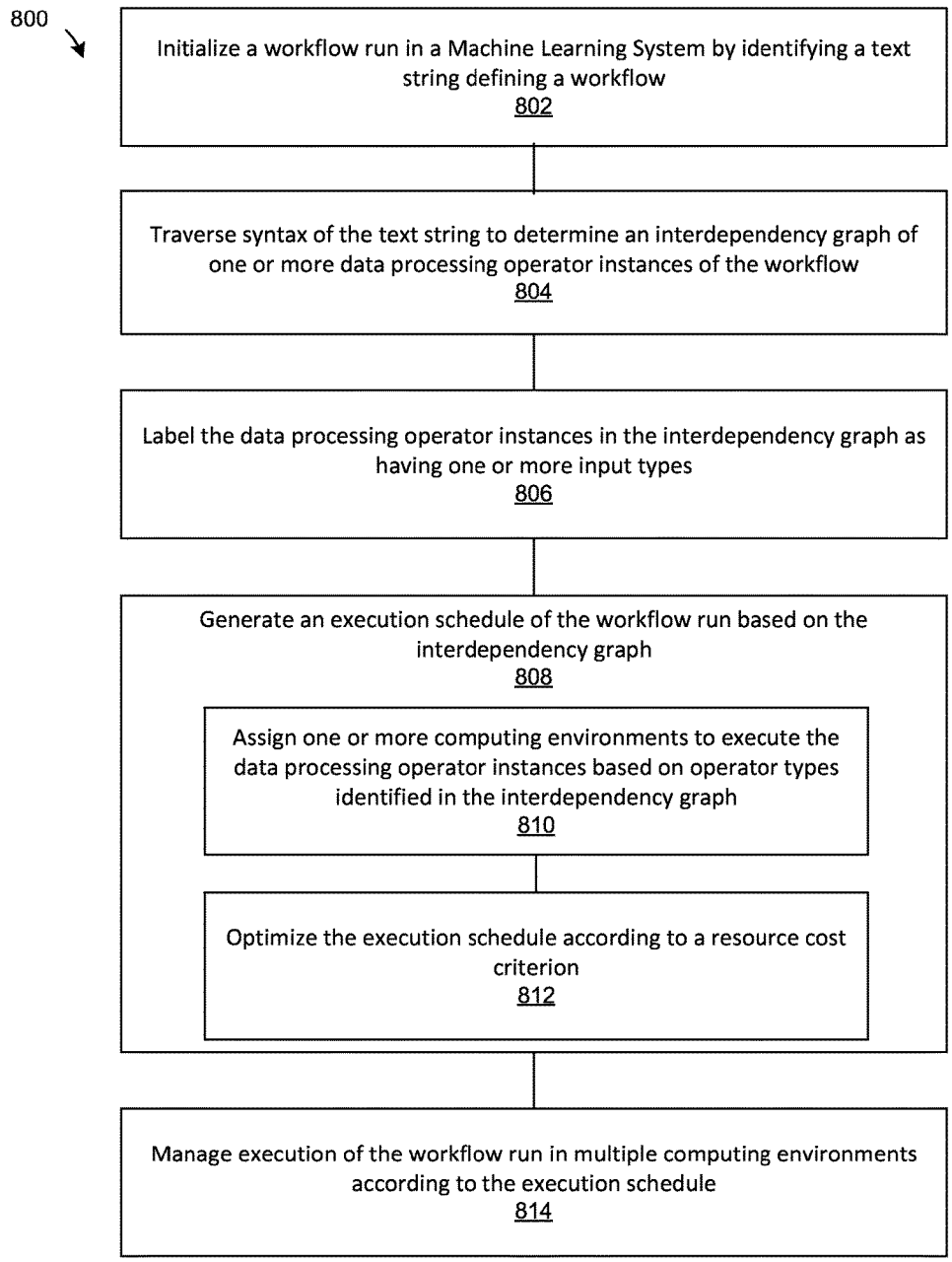
FIG. 8 is a flow chart illustrating a method of operating a machine learning system, in accordance with various embodiments

FIG. 8 is a flow chart illustrating a method 800 of operating a machine learning system (e.g., the machine learning system 200 of FIG. 2), in accordance with various embodiments. The machine learning system can be part of an application service system (e.g., the application service system 100 of FIG. 1). At step 802, the machine learning system can initialize a workflow run in a machine learning system by identifying a text string defining a workflow. At step 804, the machine learning system can traverse syntax of the text string to determine an interdependency graph of one or more data processing operator instances of the workflow. The data processing operator instances are associated with one or more data processing operator types. The machine learning system can traverse the syntax in depth-first traversal or breadth-first traversal.

As part of the traversal, the machine learning system can match input and output types of the data processing operator types identified in the syntax. For example, the machine learning system can identify a pair of data processing operator instances in the text string, where one data processing operator instance references the other as a source of its input or as a destination of its output. The machine learning system can construct a directed edge (e.g., in a direction from an output of an operator instance that feeds into an input of another operator instance) between the pair of data processing operator instances. The machine learning system can iterate until all potential pairs in the text string are constructed into directed edges. The interdependency graph can be used to identify one or more independent operator instances that are capable of parallel execution.

At step 806, the machine learning system can label the data processing operator instances in the interdependency graph as having one or more input types. Step 804 can be in response to traversing the syntax. The input type of a data processing operator instance can include one or more promised objects (e.g., outputs by other data processing operator instances), constant objects (e.g., constant values defined in the workflow or the data processing operator types associated with the data processing operator instances), externally available objects (e.g., downloadable objects from a database or a repository accessible via a network), run-time initiated objects (e.g., user defined values when the workflow run is defined), or any combination thereof.

At step 808, the machine learning system can generate an execution schedule of the workflow run based on the interdependency graph. For example, step 808 can include identifying one or more independent data processing operator instances in the interdependency graph to start the execution of the workflow run. The independent data processing operator instances are scheduled to be executed in parallel. An "independent data processing operator instance" is an operator instance that does not depend on, or take as its input, an output result of any other data processing operator instances. Step 808 can include scheduling execution of a dependent data processing operator instance in the interdependency graph to be triggered by completion of another data processing operator instance. The other data processing operator instance can be an independent data processing operator instance in the interdependency graph or another dependent data processing operator instance.

Step 808 can include sub-step 810, where a workflow execution engine (e.g., the workflow execution engine 128 or the execution scheduler engine 230) assigns one or more computing environments to execute the data processing operator instances based on operator types identified in the interdependency graph. The assignment can also be based on resource constraints associated with the data processing operator instances or the data processing operator types. The resource constraints can be defined as part of the workflow run or as respective attributes of the data processing operator types. The execution schedule can include one or more execution requests associated with the data processing operator instances for the assigned computing environments. The assigned computing environments can be selected from a computing environment candidate pool. For example, the candidate pool can include physical computing devices, virtual computing devices, data centers, computing clusters, or any combination thereof.

Step 808 can include sub-step 812. At sub-step 812, the workflow execution engine can optimize the execution schedule according to a resource cost criterion. For example, the workflow execution engine can configure the execution scheduler to maximize parallel processing and/or memoization utilization (e.g., how frequently the memoization repository is used to avoid executing an operator instance). The workflow execution engine can also configure the execution schedule to minimize resource commitments (e.g., processor commitment, persistent memory commitment, run-time/operational memory commitment, network bandwidth commitment, or any combination thereof), such as to the computing environment candidate pool. In some embodiments, the workflow execution engine can take into account one or more other workflow runs scheduled to be executed by the machine learning system. For example, the other workflow runs can share the computing environment candidate pool with the workflow run. This way, the machine learning system can maximize parallel processing and/or memoization utilization, and/or minimize resource commitment globally across all or a subset of the workflow runs in the machine learning system.

At step 814, the machine learning system can manage execution of the workflow run in multiple computing environments according to the execution schedule. For example, the machine learning system can manage the execution of the workflow run according to the method 900 of FIG. 9 and/or the method 1000 of FIG. 10.

Figure 9:
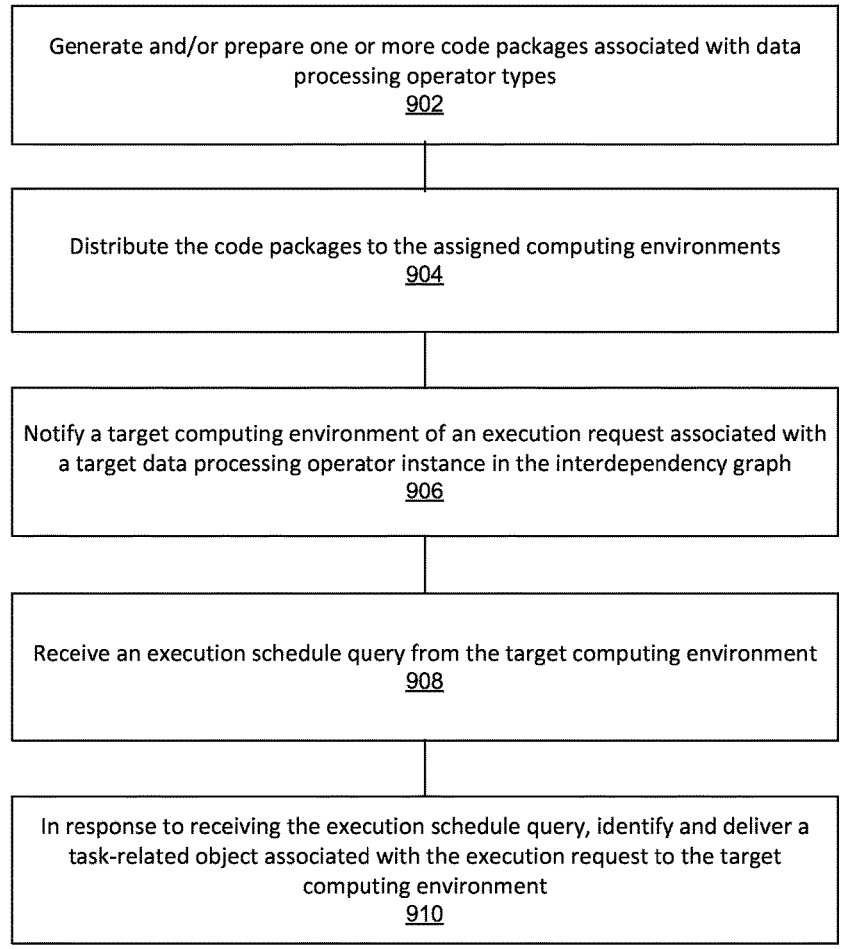
FIG. 9 is a flow chart illustrating a method for managing the execution of a workflow run, in accordance with various embodiments.

FIG. 9 is a flow chart illustrating a method 900 for managing the execution of a workflow run, in accordance with various embodiments. For example, the method 900 can be performed by a workflow execution engine (e.g., the workflow execution engine 128 of FIG. 1 or the execution scheduler engine 230 of FIG. 2).

At step 902, the machine learning system can generate and/or prepare one or more code packages associated with data processing operator types (e.g., from steps 802 and 804). For example, the machine learning system can serialize the data processing operator types to be included in the code packages. In some embodiments, a code package includes an operator type definition (e.g., the operator type definition 300), pre-compiled executables, imported code (e.g., text according to syntax of a programming language), other computer-logic libraries, or any combination thereof. The machine learning system can store the code packages in a repository (e.g., the operator repository 222 of FIG. 2) for access by at least one of the computing environments (e.g., from sub-step 808 of FIG. 8) available for workflow execution. At step 904, the workflow execution engine can distribute the code packages to the assigned computing environments.

At step 906, the workflow execution engine can notify at least one of the computing environments (a "target computing environment") of an execution request (e.g., an assigned task) associated with a target data processing operator instance in the interdependency graph. In some embodiments, step 906 is part of step 904. The workflow execution engine can send a message identifying, to the target computing environment, where to retrieve an input dataset or an input parameter for the target data processing operator instance, where to store a resulting output of the target data processing operator instance, one or more identifiers of the libraries required to execute the target processing operator instance, one or more identifiers that specifies the workflow run that the execution request is part of, or any combination thereof.

In some embodiments, the notification message sent to the target computing environment at step 906 does not include all of the information necessary to fulfill the execution request. For example, at step 908, the workflow execution engine can receive an execution schedule query from the target computing environment. At step 910, the workflow execution engine can identify and deliver, in response to receiving the execution schedule query, a task-related object associated with the execution request to the target computing environment. The task related object can be a serialized data processing operator type definition associated with the target data processing operator instance, an input dataset for the target data processing operator instance, an input parameter for the target data processing operator instance, or any combination thereof.

Figure 10:
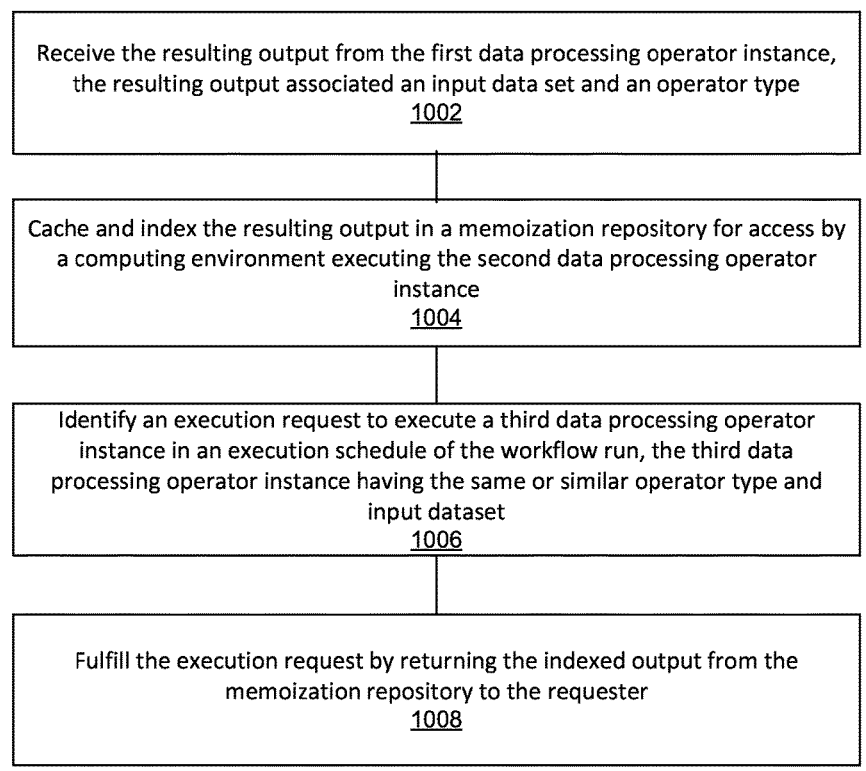
FIG. 10 is a flow chart illustrating an example method of passing outputs of data processing operator instances, in accordance with various embodiments.

FIG. 10 is a flow chart illustrating an example method 1000 of passing outputs of data processing operator instances, in accordance with various embodiments. For example, the method 1000 can be performed by a workflow execution engine (e.g., the workflow execution engine 128 of FIG. 1 or the execution scheduler engine 230 of FIG. 2). For example, the method 1000 can include passing a resulting output of a first data processing operator instance to a second data processing operator instance. At step 1002, the workflow execution engine can receive the resulting output from the first data processing operator instance. This step can signal the completion of the first data processing operator instance. The second data processing operator instance can depend on the resulting output of the first data processing operator instance. The resulting output can be associated with an input dataset and a first data processing operator type.

At step 1004, the workflow execution engine can cache the resulting output in a memoization repository for access by a computing environment executing the second data processing operator instance. The workflow execution engine can index the resulting output in the memoization repository by an identifiable input (e.g., the input dataset) and the first data processing operator type that is associated with the first data processing operator instance. In some embodiments, indexing the output includes tracking a version number of the first data processing operator type. The versioning of the data processing operator types enables for the workflow execution engine to determine whether or not the result of one version of the data processing operator type is equally applicable to a different version, even if the input data is the same.

In some embodiments, instead of passing the resulting output via the memoization repository, the operator instances can communication with each other directly. For example, the workflow execution engine can identify network addresses of the operator instances to each other such that the first data processing operator instance can send the resulting output directly to the second data processing operator instance.

At step 1006, the workflow execution engine can identify an execution request to execute a third data processing operator instance in an execution schedule of the workflow run. For example, the execution request can schedule for processing the identifiable input through the third data processing operator instance of the same data processing operator type as the first data processing operator instance. The execution request can be associated with a requesting entity, for example, a computing device running the third data processing operator instance.

In response to the execution request and prior to executing the other instance of the data processing operator type, at step 1008, the workflow execution engine can fulfill the execution request by returning the indexed output from the memoization repository to the requester. In some embodiments, the memoization repository is exposed globally in a machine learning system (e.g., the machine learning system 200 of FIG. 2). For example, the execution request and the other instance can be associated with another workflow run different from the initialized workflow run (e.g., as discussed in step 802 of FIG. 8). In another example, the execution request and the other instance can be associated with another workflow different from the workflow defined by the text string (e.g., as discussed in step 802 of FIG. 8).

Figure 11:
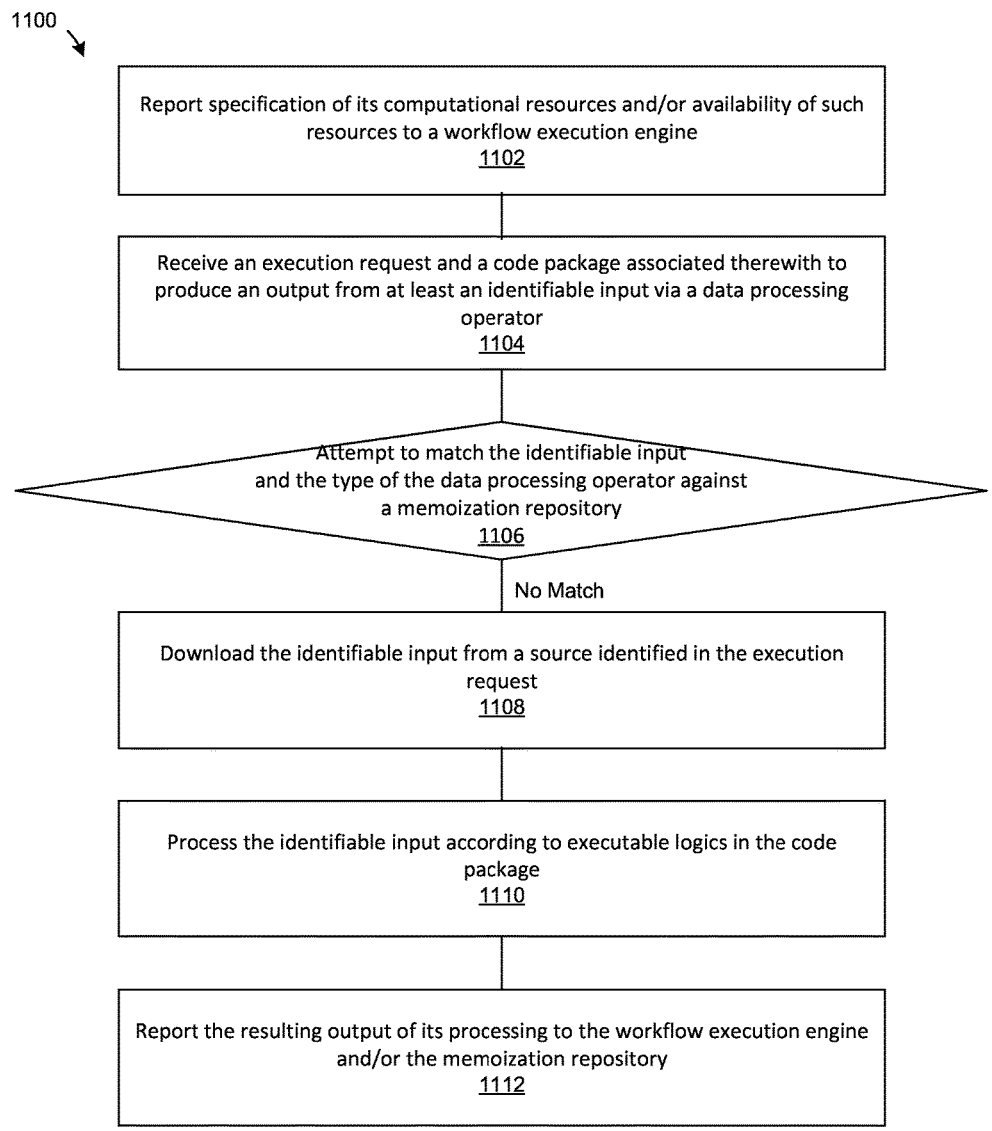
FIG. 11 is a flow chart illustrating a method of preparing a computing environment to fulfill an execution request, in accordance with various embodiments.

FIG. 11 is a flow chart illustrating a method 1100 of preparing a computing environment (e.g., a computing device in the backend computation pool 236 of FIG. 2) to fulfill an execution request, in accordance with various embodiments. At step 1102, the computing environment can report specification of its computational resources (e.g., processor spec, operational memory spec, persistent memory spec, network bandwidth spec, or any combination thereof) and/or availability of such resources to a workflow execution engine (e.g., the workflow execution engine 128 of FIG. 1 or the execution scheduler engine 230 of FIG. 2).

At step 1104, the computing environment can receive an execution request and a code package associated therewith to produce an output from at least an identifiable input via a data processing operator. At step 1106, the computing environment can attempt to match the identifiable input and the type of the data processing operator against a memoization repository (e.g., the memoization repository 242 of FIG. 2). In some embodiments, step 1106 is performed by the workflow execution engine. If a match is found, the computing environment notifies the workflow execution engine to utilize the matching output result available in the memoization repository. If a match is not found, the computing environment can download, at step 1108, the identifiable input from a source identified in the execution request. The source can be the memoization repository, another database maintained by the workflow execution engine, or an external database accessible via a network. Once the identifiable input is retrieved, the computing environment can process, at step 1110, the identifiable input according to executable logics in the code package. At step 1112, the computing environment can report the resulting output of its processing to the workflow execution engine and/or the memoization repository.

While processes or blocks are presented in a given order in this disclosure, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Figure 5:
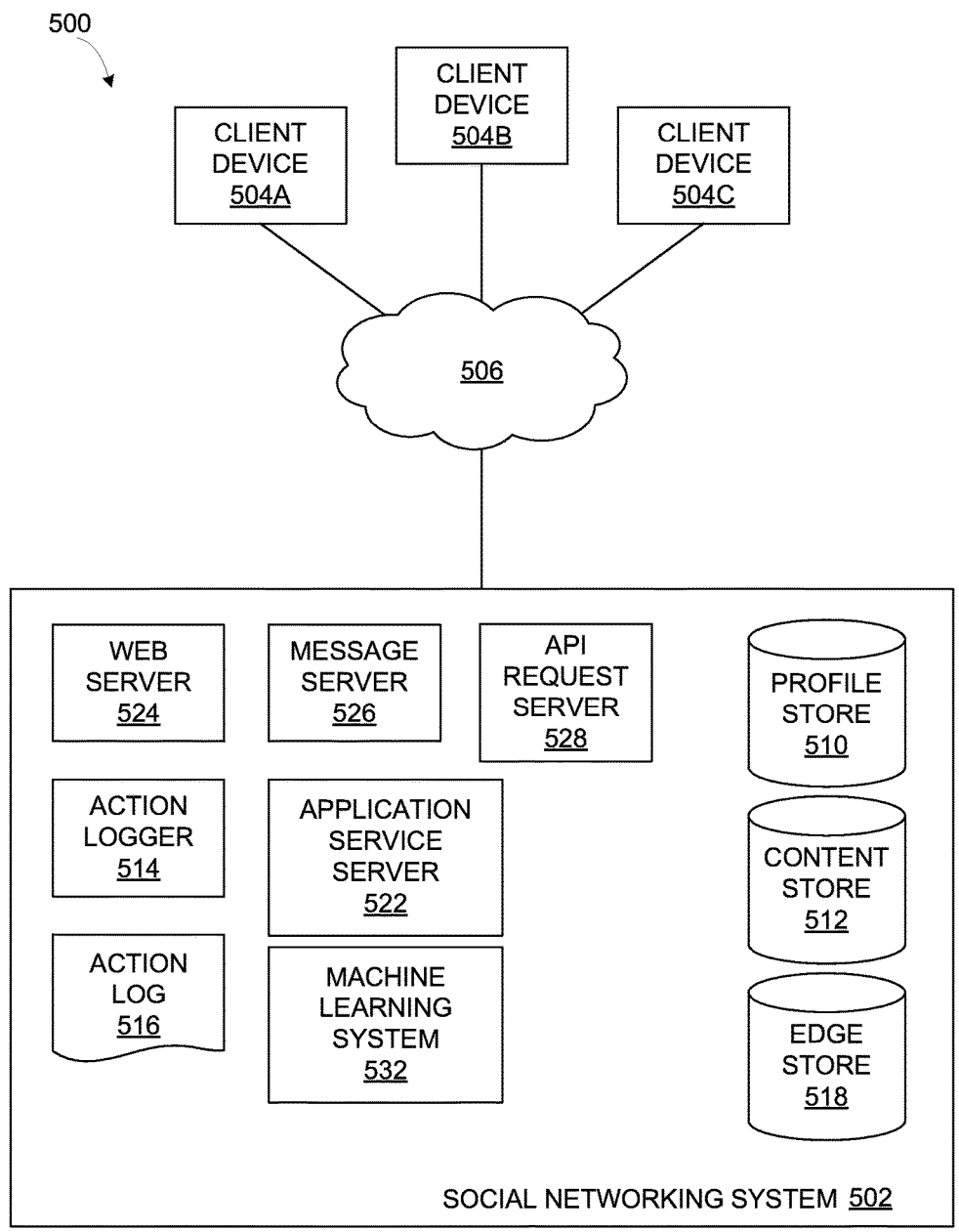
FIG. 5 is a high-level block diagram of a system environment suitable for a social networking system, in accordance with various embodiments.

FIG. 5 is a high-level block diagram of a system environment 500 suitable for a social networking system 502, in accordance with various embodiments. The system environment 500 shown in FIG. 5 includes the social networking system 502 (e.g., the application service system 100 of FIG. 1), a client device 504A, and a network channel 506. The system environment 500 can include other client devices as well, e.g., a client device 504B and a client device 504C. In other embodiments, the system environment 500 may include different and/or additional components than those shown by FIG. 5. The machine learning system 200 of FIG. 2 can be implemented in the social networking system 502.
Social Networking System Environment and Architecture The social networking system 502, further described below, comprises one or more computing devices storing user profiles associated with users (i.e., social networking accounts) and/or other objects as well as connections between users and other users and/or objects. Users join the social networking system 502 and then add connections to other users or objects of the social networking system to which they desire to be connected. Users of the social networking system 502 may be individuals or entities, e.g., businesses, organizations, universities, manufacturers, etc. The social networking system 502 enables its users to interact with each other as well as with other objects maintained by the social networking system 502. In some embodiments, the social networking system 502 enables users to interact with third-party websites and a financial account provider.

Based on stored data about users, objects and connections between users and/or objects, the social networking system 502 generates and maintains a "social graph" comprising multiple nodes interconnected by multiple edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 502 adds and/or modifies edges connecting the various nodes to reflect the interactions.

The client device 504A is a computing device capable of receiving user input as well as transmitting and/or receiving data via the network channel 506. In at least one embodiment, the client device 504A is a conventional computer system, e.g., a desktop or laptop computer. In another embodiment, the client device 504A may be a device having computer functionality, e.g., a personal digital assistant (PDA), mobile telephone, a tablet, a smart-phone or similar device. In yet another embodiment, the client device 504A can be a virtualized desktop running on a cloud computing service. The client device 504A is configured to communicate with the social networking system 502 via a network channel 506 (e.g., an intranet or the Internet). In at least one embodiment, the client device 504A executes an application enabling a user of the client device 504A to interact with the social networking system 502. For example, the client device 504A executes a browser application to enable interaction between the client device 504A and the social networking system 502 via the network channel 506. In another embodiment, the client device 504A interacts with the social networking system 502 through an application programming interface (API) that runs on the native operating system of the client device 504A, e.g., IOS® or ANDROID™.

The client device 504A is configured to communicate via the network channel 506, which may comprise any combination of local area and/or wide area networks, using both wired and wireless communication systems. In at least one embodiment, the network channel 506 uses standard communications technologies and/or protocols. Thus, the network channel 506 may include links using technologies, e.g., Ethernet, 802.11, worldwide interoperability for microwave access (WiMAX), 3G, 4G, CDMA, digital subscriber line (DSL), etc. Similarly, the networking protocols used on the network channel 506 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network channel 506 may be represented using technologies and/or formats including hypertext markup language (HTML) or extensible markup language (XML). In addition, all or some of links can be encrypted using conventional encryption technologies, e.g., secure sockets layer (SSL), transport layer security (TLS), and Internet Protocol security (IPsec).

The social networking system 502 includes a profile store 510, a content store 512, an action logger 514, an action log 516, an edge store 518, an application service server 522, a web server 524, a message server 526, an application service interface (API) request server 528, a machine learning system 532, or any combination thereof. In other embodiments, the social networking system 502 may include additional, fewer, or different modules for various applications.

User of the social networking system 502 can be associated with a user profile, which is stored in the profile store 510. The user profile is associated with a social networking account. A user profile includes declarative information about the user that was explicitly shared by the user, and may include profile information inferred by the social networking system 502. In some embodiments, a user profile includes multiple data fields, each data field describing one or more attributes of the corresponding user of the social networking system 502. The user profile information stored in the profile store 510 describes the users of the social networking system 502, including biographic, demographic, and other types of descriptive information, e.g., work experience, educational history, gender, hobbies or preferences, location and the like. A user profile may also store other information provided by the user, for example, images or videos. In some embodiments, images of users may be tagged with identification information of users of the social networking system 502 displayed in an image. A user profile in the profile store 510 may also maintain references to actions by the corresponding user performed on content items (e.g., items in the content store 512) and stored in the edge store 518 or the action log 516.

A user profile may be associated with one or more financial accounts, enabling the user profile to include data retrieved from or derived from a financial account. In some embodiments, information from the financial account is stored in the profile store 510. In other embodiments, it may be stored in an external store.

A user may specify one or more privacy settings, which are stored in the user profile, that limit information shared through the social networking system 502. For example, a privacy setting limits access to cache appliances associated with users of the social networking system 502.

The content store 512 stores content items (e.g., images, videos, or audio files) associated with a user profile. The content store 512 can also store references to content items that are stored in an external storage or external system. Content items from the content store 512 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social networking system by displaying content related to users, objects, activities, or functionalities of the social networking system 502. Examples of social networking content items include suggested connections or suggestions to perform other actions, media provided to, or maintained by, the social networking system 502 (e.g., pictures or videos), status messages or links posted by users to the social networking system, events, groups, pages (e.g., representing an organization or commercial entity), and any other content provided by, or accessible via, the social networking system.

The content store 512 also includes one or more pages associated with entities having user profiles in the profile store 510. An entity can be a non-individual user of the social networking system 502, e.g., a business, a vendor, an organization, or a university. A page includes content associated with an entity and instructions for presenting the content to a social networking system user. For example, a page identifies content associated with the entity's user profile as well as information describing how to present the content to users viewing the brand page. Vendors may be associated with pages in the content store 512, enabling social networking system users to more easily interact with the vendor via the social networking system 502. A vendor identifier is associated with a vendor's page, thereby enabling the social networking system 502 to identify the vendor and/or to retrieve additional information about the vendor from the profile store 510, the action log 516 or from any other suitable source using the vendor identifier. In some embodiments, the content store 512 may also store one or more targeting criteria associated with stored objects and identifying one or more characteristics of a user to which the object is eligible to be presented.

The action logger 514 receives communications about user actions on and/or off the social networking system 502, populating the action log 516 with information about user actions. Such actions may include, for example, adding a connection to another user, sending a message to another user, uploading an image, reading a message from another user, viewing content associated with another user, attending an event posted by another user, among others. In some embodiments, the action logger 514 receives, subject to one or more privacy settings, content interaction activities associated with a user. In addition, a number of actions described in connection with other objects are directed at particular users, so these actions are associated with those users as well. These actions are stored in the action log 516.

In accordance with various embodiments, the action logger 514 is capable of receiving communications from the web server 524 about user actions on and/or off the social networking system 502. The action logger 514 populates the action log 516 with information about user actions to track them. This information may be subject to privacy settings associated with the user. Any action that a particular user takes with respect to another user is associated with each user's profile, through information maintained in a database or other data repository, e.g., the action log 516. Such actions may include, for example, adding a connection to the other user, sending a message to the other user, reading a message from the other user, viewing content associated with the other user, attending an event posted by another user, being tagged in photos with another user, liking an entity, etc.

The action log 516 may be used by the social networking system 502 to track user actions on the social networking system 502, as well as external website that communicate information to the social networking system 502. Users may interact with various objects on the social networking system 502, including commenting on posts, sharing links, and checking-in to physical locations via a mobile device, accessing content items in a sequence or other interactions. Information describing these actions is stored in the action log 516. Additional examples of interactions with objects on the social networking system 502 included in the action log 516 include commenting on a photo album, communications between users, becoming a fan of a musician, adding an event to a calendar, joining a groups, becoming a fan of a brand page, creating an event, authorizing an application, using an application and engaging in a transaction. Additionally, the action log 516 records a user's interactions with advertisements on the social networking system 502 as well as applications operating on the social networking system 502. In some embodiments, data from the action log 516 is used to infer interests or preferences of the user, augmenting the interests included in the user profile, and enabling a more complete understanding of user preferences.

Further, user actions that happened in particular context, e.g., when the user was shown or was seen accessing particular content on the social networking system 502, can be captured along with the particular context and logged. For example, a particular user could be shown/not-shown information regarding candidate users every time the particular user accessed the social networking system 502 for a fixed period of time. Any actions taken by the user during this period of time are logged along with the context information (i.e., candidate users were provided/not provided to the particular user) and are recorded in the action log 516. In addition, a number of actions described below in connection with other objects are directed at particular users, so these actions are associated with those users as well.

The action log 516 may also store user actions taken on external websites services associated with the user. The action log 516 records data about these users, including viewing histories, advertisements that were engaged, purchases or rentals made, and other patterns from content requests and/or content interactions.

In some embodiments, the edge store 518 stores the information describing connections between users and other objects on the social networking system 502 in edge objects. The edge store 518 can store the social graph described above. Some edges may be defined by users, enabling users to specify their relationships with other users. For example, users may generate edges with other users that parallel the users' real-life relationships, e.g., friends, co-workers, partners, and so forth. Other edges are generated when users interact with objects in the social networking system 502, e.g., expressing interest in a page or a content item on the social networking system, sharing a link with other users of the social networking system, and commenting on posts made by other users of the social networking system. The edge store 518 stores edge objects that include information about the edge, e.g., affinity scores for objects, interests, and other users. Affinity scores may be computed by the social networking system 502 over time to approximate a user's affinity for an object, interest, and other users in the social networking system 502 based on the actions performed by the user. Multiple interactions of the same type between a user and a specific object may be stored in one edge object in the edge store 518, in at least one embodiment. In some embodiments, connections between users may be stored in the profile store 510. In some embodiments, the profile store 510 may reference or be referenced by the edge store 518 to determine connections between users. Users may select from predefined types of connections, or define their own connection types as needed.

The web server 524 links the social networking system 502 via a network to one or more client devices; the web server 524 serves web pages, as well as other web-related content, e.g., Java, Flash, XML, and so forth. The web server 524 may communicate with the message server 526 that provides the functionality of receiving and routing messages between the social networking system 502 and client devices. The messages processed by the message server 526 can be instant messages, email messages, text and SMS (short message service) messages, photos, or any other suitable messaging technique. In some embodiments, a message sent by a user to another user can be viewed by other users of the social networking system 502, for example, by the connections of the user receiving the message. An example of a type of message that can be viewed by other users of the social networking system besides the recipient of the message is a wall post. In some embodiments, a user can send a private message to another user that can only be retrieved by the other user.

The API request server 528 enables external systems to access information from the social networking system 502 by calling APIs. The information provided by the social network may include user profile information or the connection information of users as determined by their individual privacy settings. For example, a system interested in predicting the probability of users forming a connection within a social networking system may send an API request to the social networking system 502 via a network. The API request server 528 of the social networking system 502 receives the API request. The API request server 528 processes the request by determining the appropriate response, which is then communicated back to the requesting system via a network.

The application service server 522 can implement at least one application service, for example, one of the application services 102 of FIG. 1. In several embodiments, the social networking system 502 can include multiple application service servers implementing multiple application services.

The machine learning system 532 can be the machine learning system 200 of FIG. 2. The machine learning system 532 can enable developer/analyst users to define, modify, track, schedule, execute, compare, analyze, evaluate, and/or deploy one or more workflows associated with running machine learning training and experiments corresponding to one or more application services of the social networking system 502. The machine learning system 532 can also enable developer/analyst users to modularly produce new workflows to refine machine learning models and to evaluate the efficacy of the machine learning models.

Functional components (e.g., circuits, devices, engines, modules, and data storages, etc.) associated with the application service system 100 of FIG. 1, the machine learning system 200 of FIG. 2, and/or the social networking system 502 of FIG. 5, can be implemented as a combination of circuitry, firmware, software, or other functional instructions. For example, the functional components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). Other arrays, systems and devices described above may include additional, fewer, or different functional components for various applications.

Figure 6:
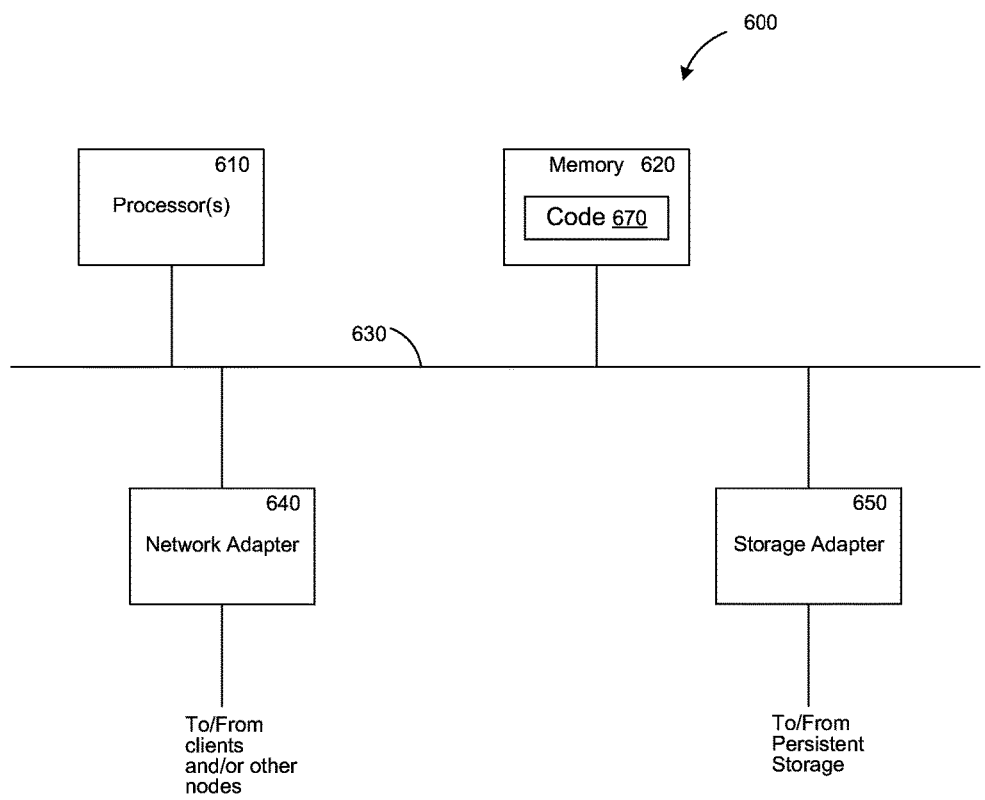
FIG. 6 is a block diagram of an example of a computing device, which may represent one or more computing device or server described herein, in accordance with various embodiments

FIG. 6 is a block diagram of an example of a computing device 600, which may represent one or more computing device or server described herein, in accordance with various embodiments. The computing device 600 can be one or more computing devices that implement the application service system 100 of FIG. 1 and/or the machine learning system 200 of FIG. 2. The computing device 600 can execute at least part of the method 1000 of FIG. 10. The computing device 600 includes one or more processors 610 and memory 620 coupled to an interconnect 630. The interconnect 630 shown in FIG. 6 is an abstraction that represents any one or more separate physical buses, point-to-point connections, or both connected by appropriate bridges, adapters, or controllers. The interconnect 630, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 610 is/are the central processing unit (CPU) of the computing device 600 and thus controls the overall operation of the computing device 600. In certain embodiments, the processor(s) 610 accomplishes this by executing software or firmware stored in memory 620. The processor(s) 610 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 620 is or includes the main memory of the computing device 600. The memory 620 represents any form of random access memory (RAM), read-only memory (ROM), flash memory, or the like, or a combination of such devices. In use, the memory 620 may contain a code 670 containing instructions according to the mesh connection system disclosed herein.

Also connected to the processor(s) 610 through the interconnect 630 are a network adapter 640 and a storage adapter 650. The network adapter 640 provides the computing device 600 with the ability to communicate with remote devices, over a network and may be, for example, an Ethernet adapter or Fibre Channel adapter. The network adapter 640 may also provide the computing device 600 with the ability to communicate with other computers. The storage adapter 650 enables the computing device 600 to access a persistent storage, and may be, for example, a Fibre Channel adapter or SCSI adapter.

The code 670 stored in memory 620 may be implemented as software and/or firmware to program the processor(s) 610 to carry out actions described above. In certain embodiments, such software or firmware may be initially provided to the computing device 600 by downloading it from a remote system through the computing device 600 (e.g., via network adapter 640).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; and/or optical storage media; flash memory devices), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification. Reference in this specification to "various embodiments" or "some embodiments" means that a particular feature, structure, or characteristic described in connection with the embodiment is included in at least one embodiment of the disclosure. Alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments. Reference in this specification to where a result of an action is "based on" another element or feature means that the result produced by the action can change depending at least on the nature of the other element or feature.

What is claimed is:

1. A computer-implemented method, comprising:
   initializing a workflow run in a machine learning system by identifying a text string defining a workflow, the text string including descriptions of a plurality of data processing operator instances, descriptions of an input data source for each of the data processing operating instances, and descriptions of an output data source for each of the data processing operating instances;
   traversing syntax of the text string to determine an interdependency graph of the plurality of data processing operator instances of the workflow by generating directed edges between pairs of data processing operator instances in which an which an output data source of a first data processing operating instance in a given pair of data processing operating instances matches an input data source of a second data processing operating instance;

detecting in the interdependency graph, independent data processing operating instances that have input data sources that are independent of any output data sources of other data processing operating instances, and a dependent data processing operating instance that has an input data source matching an output data source of a connected data processing operating instance;

generating an execution schedule of the workflow run based on the interdependency graph in which the independent data processing operating instances are scheduled to execute in parallel, and in which the dependent processing operating instance is scheduled to execute upon completion of the connected data processing operating instance;

causing execution of the workflow run on one or more computing devices according to the execution schedule; and indexing an output of a data processing operator instance from among the data processing operator instances in a memoization repository, wherein the output is indexed as a result of processing an identifiable input through a data processing operator type associated with the data processing operator instance.

2. The computer-implemented method of claim 1, further comprising labeling the data processing operator instances in the interdependency graph as having one or more input types, wherein the input types include promised objects, constant objects, externally available objects, run-time initiated objects, or any combination thereof.

3. The computer-implemented method of claim 1, further comprising serializing the data processing operators into an operator database for access by at least one of the computing environments.

4. The computer-implemented method of claim 1, further comprising:
identifying an execution request to run the identifiable input through another instance of the data processing operator type; and
sending the indexed output from the memoization repository in response to the execution request.

5. The computer-implemented method of claim 4, wherein the execution request and the other instance are associated with another workflow run different from the initialized workflow run.

6. The computer-implemented method of claim 4, wherein the execution request and the other instance are associated with another workflow different from the workflow defined by the text string.

7. The computer-implemented method of claim 4, wherein indexing the output includes tracking a version number of the data processing operator type.

8. The computer-implemented method of claim 1, further comprising:
receiving a resulting output from the connected data processing operator instance; and
caching the resulting output in the memoization repository for access by a computing environment executing the dependent data processing operator instance.

9. A non-transitory computer readable data memory storing computer-executable instructions that, when executed by a computer system, cause the computer system to perform a computer-implemented method, the method comprising:
initializing a workflow run in a machine learning system by identifying a text string defining a workflow, the text string including descriptions of a plurality of data processing operator instances, descriptions of an input data source for each of the data processing operating instances, and descriptions of an output data source for each of the data processing operating instances;
traversing syntax of the text string to determine an interdependency graph of the plurality of data processing operator instances of the workflow by generating directed edges between pairs of data processing operator instances in which an which an output data source of a first data processing operating instance in a given pair of data processing operating instances matches an input data source of a second data processing operating instance;
assigning one or more computing environments to execute the data processing operator instances based on the interdependency graph and resource constraints associated with the data processing operator instances;
generating a schedule plan of one or more execution requests associated with the data processing operator instances to the assigned computing environments; and
facilitating passing of an output from at least one of the data processing operator instances by caching the output in a memoization repository for access by another data processing operator instance.

10. The non-transitory computer readable data memory of claim 9, wherein the resource constraints are defined as part of the workflow run or as respective attributes of the data processing operator types.

11. The non-transitory computer readable data memory of claim 9, wherein the method further comprises distributing one or more code packages associated with the data processing operator types to the assigned computing environments.

12. The non-transitory computer readable data memory of claim 11, wherein the method further comprises notifying at least one of the computing environments of an execution request associated with a target data processing operator instance in the interdependency graph.

13. The non-transitory computer readable data memory of claim 12, wherein the method further comprises:
receiving an execution schedule query from the at least one of the computing environments; and
identifying, in response to receiving the execution schedule query, a task-related object associated with the execution request for the at least one of the computing environment.

14. The non-transitory computer readable data memory of claim 13, wherein the task related object is a serialized data processing operator type definition associated with the target data processing operator instance, an input dataset for the target data processing operator instance, an input parameter for the target data processing operator instance, or any combination thereof.

15. The non-transitory computer readable data memory of claim 13, wherein said notifying includes identifying, to the at least one of the computing environments, where to retrieve an input dataset or an input parameter for the target data processing operator instance, where to store a resulting output of the target data processing operator instance, one or more identifiers of code or executable libraries required to execute the target processing operator instance, one or more identifiers of other data processing operator instances adjacent to the target data processing operator instance in the interdependency graph, or any combination thereof.

16. A non-transitory computer-readable storage medium storing instructions that when executed by a processor cause the processor to perform steps comprising:
initializing a workflow run in a machine learning system by identifying a text string defining a workflow, the text string including descriptions of a plurality of data processing operator instances, descriptions of an input data source for each of the data processing operating instances, and descriptions of an output data source for each of the data processing operating instances;

traversing syntax of the text string to determine an interdependency graph of the plurality of data processing operator instances of the workflow by generating directed edges between pairs of data processing operator instances in which an which an output data source of a first data processing operating instance in a given pair of data processing operating instances matches an input data source of a second data processing operating instance;

detecting in the interdependency graph, independent data processing operating instances that have input data sources that are independent of any output data sources of other data processing operating instances, and a dependent data processing operating instance that has an input data source matching an output data source of a connected data processing operating instance;

generating an execution schedule of the workflow run based on the interdependency graph in which the independent data processing operating instances are scheduled to execute in parallel, and in which the dependent processing operating instance is scheduled to execute upon completion of the connected data processing operating instance;

causing execution of the workflow run on one or more computing devices according to the execution schedule; and indexing an output of a data processing operator instance from among the data processing operator instances in a memoization repository, wherein the output is indexed as a result of processing an identifiable input through a data processing operator type associated with the data processing operator instance.

17. The non-transitory computer-readable storage medium of claim 16, the instructions when executed further causing the processor to perform steps comprising labeling the data processing operator instances in the interdependency graph as having one or more input types, wherein the input types include promised objects, constant objects, externally available objects, run-time initiated objects, or any combination thereof.

18. The non-transitory computer-readable storage medium of claim 16, the instructions when executed further causing the processor to perform steps comprising serializing the data processing operators into an operator database for access by at least one of the computing environments.

19. The non-transitory computer-readable storage medium of claim 16, the instructions when executed further causing the processor to perform steps comprising:
identifying an execution request to run the identifiable input through another instance of the data processing operator type; and
sending the indexed output from the memoization repository in response to the execution request.

20. The non-transitory computer-readable storage medium of claim 19, wherein the execution request and the other instance are associated with another workflow run different from the initialized workflow run.

* * * * *